Dec. 3, 1957 R. R. CONE 2,815,178
THREAD PACKAGE WINDING APPARATUS
Filed April 20, 1955 23 Sheets-Sheet 2
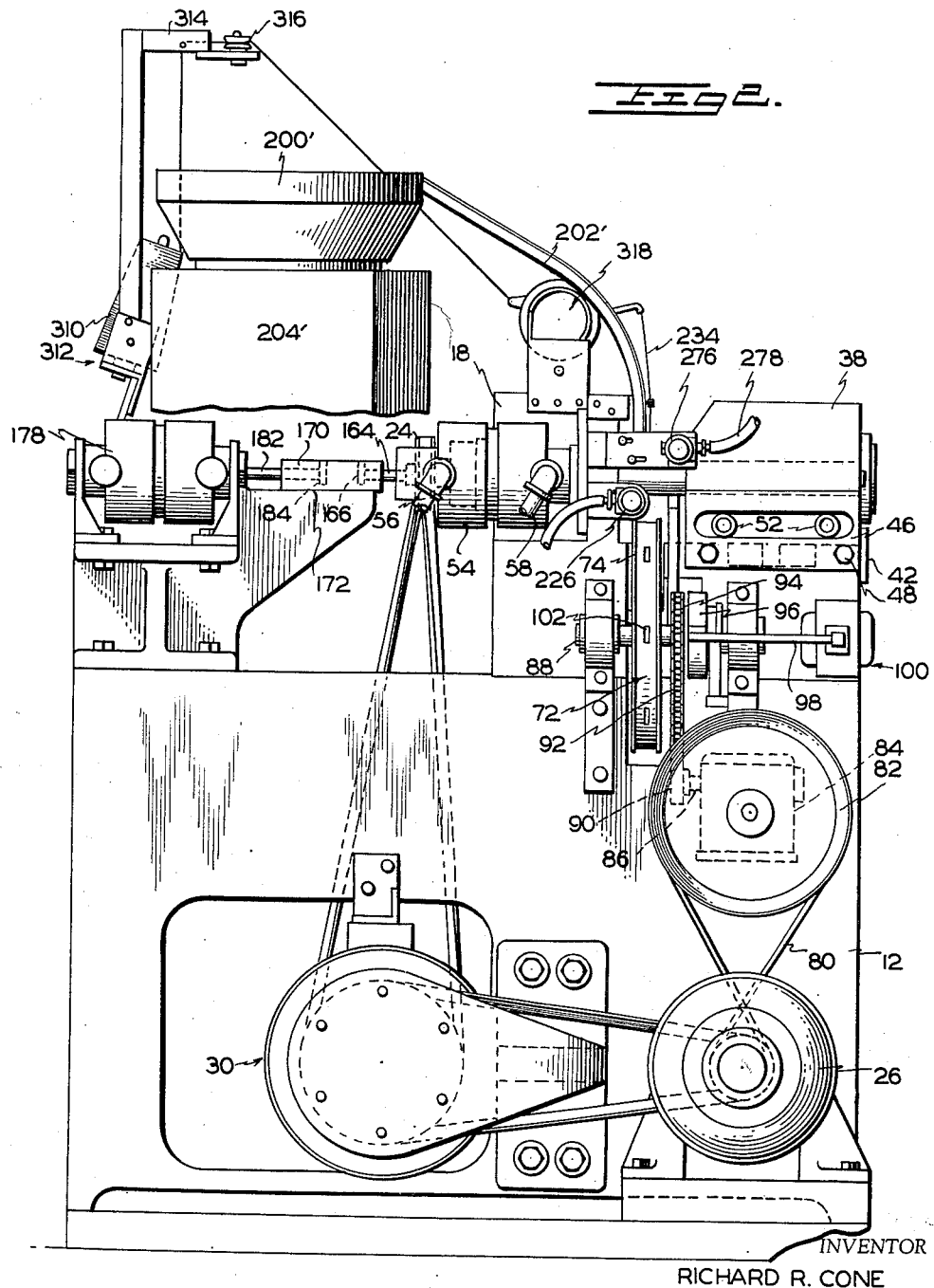
INVENTOR
RICHARD R. CONE
BY Harold T. Stowell
ATTORNEY Dec. 3, 1957   R. R. CONE   2,815,178
THREAD PACKAGE WINDING APPARATUS
Filed April 20, 1955   23 Sheets-Sheet 3
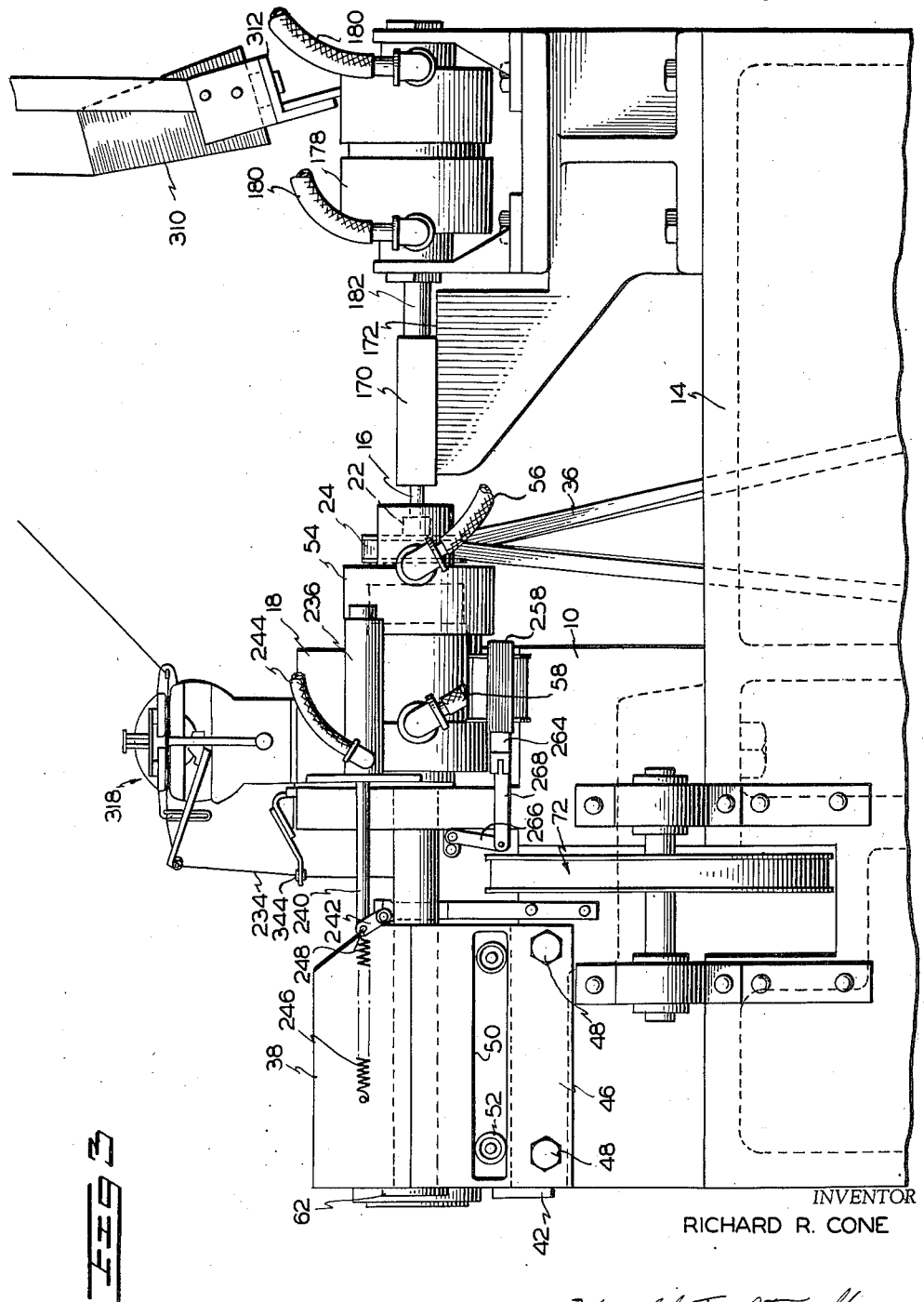
INVENTOR
RICHARD R. CONE
BY Harold T. Stowell
ATTORNEY

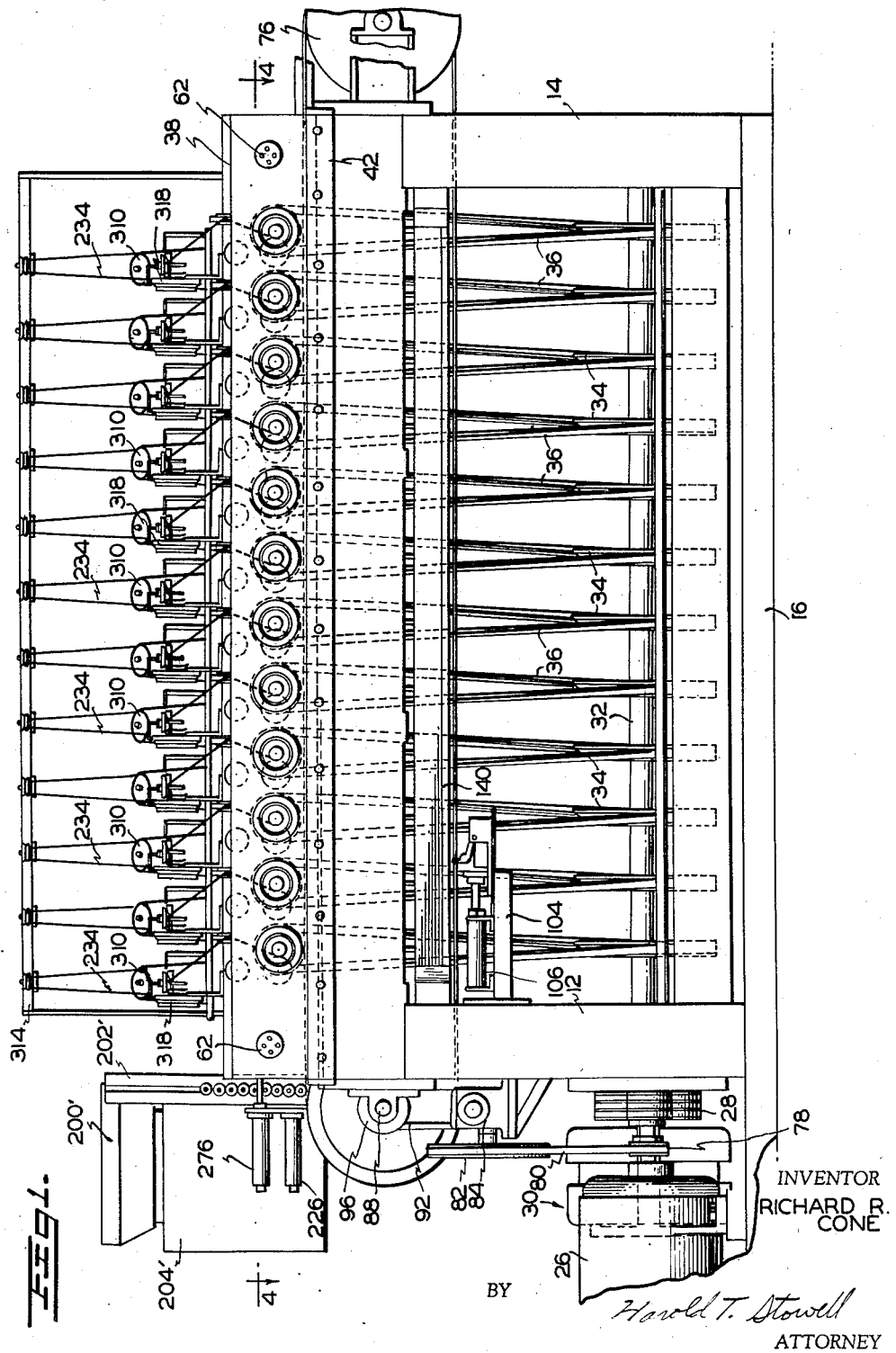

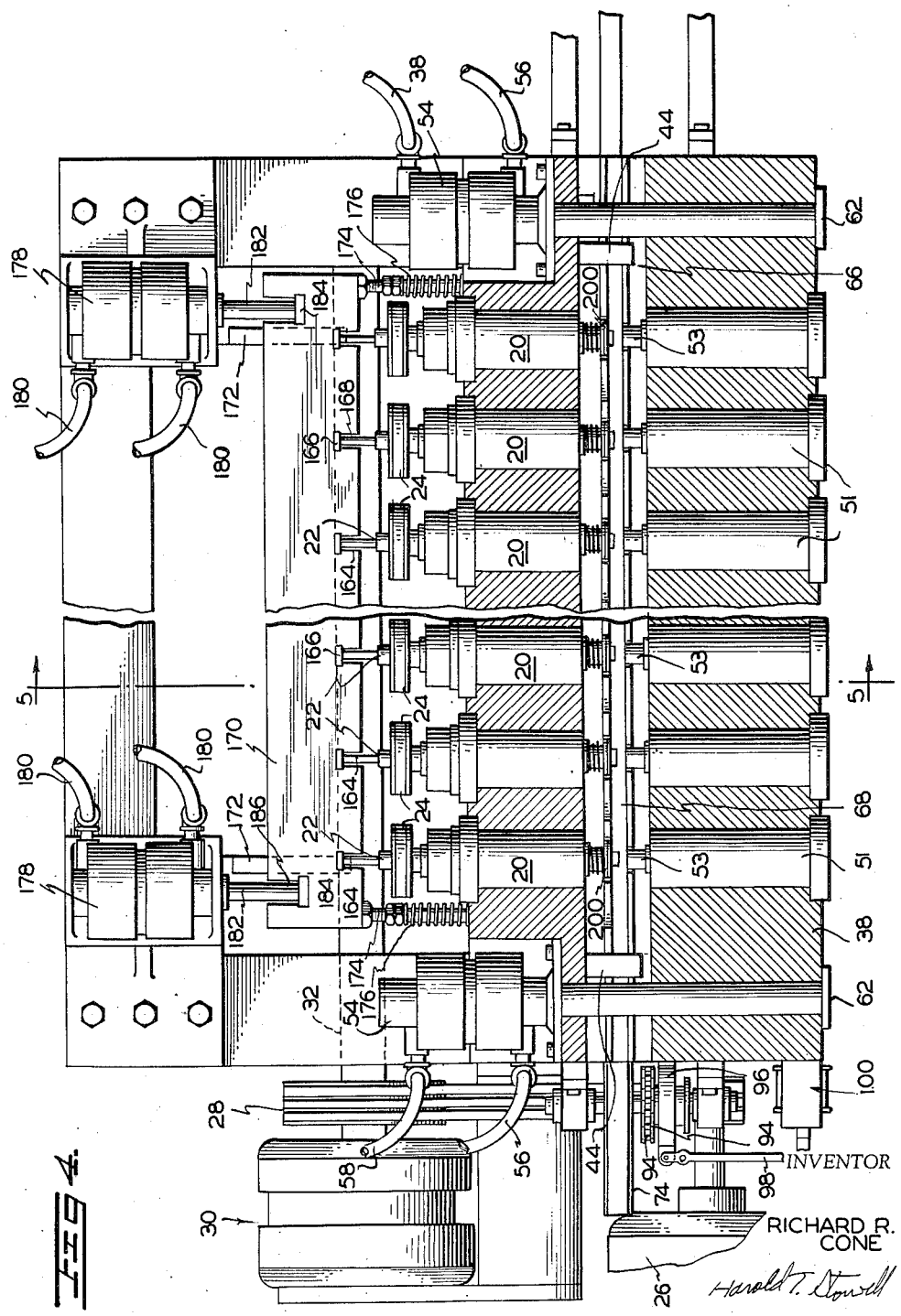

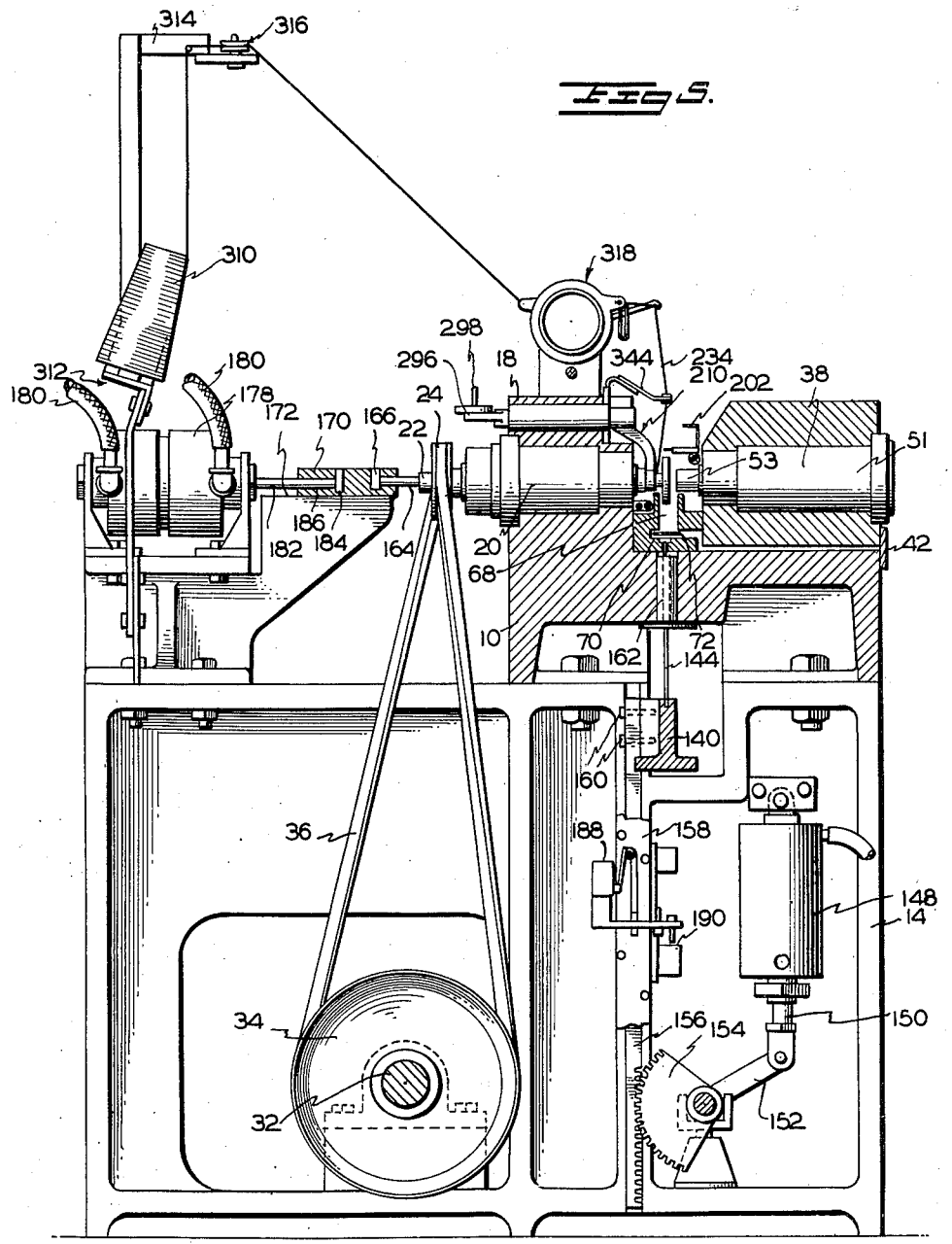

Dec. 3, 1957 R. R. CONE 2,815,178
THREAD PACKAGE WINDING APPARATUS
Filed April 20, 1955 23 Sheets-Sheet 6
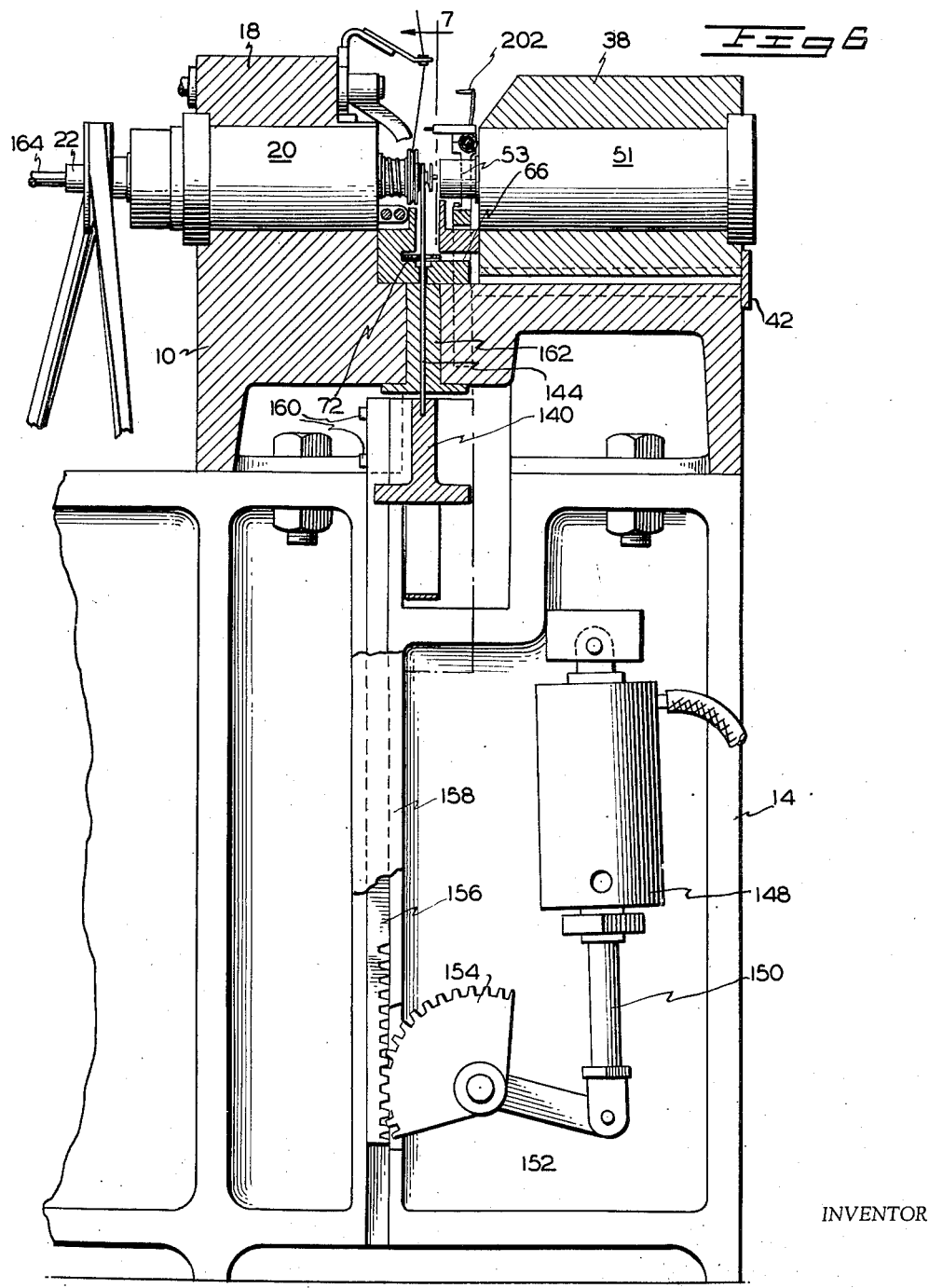
INVENTOR
RICHARD R. CONE
BY Harold T. Stowell
ATTORNEY Dec. 3, 1957  R. R. CONE  2,815,178
THREAD PACKAGE WINDING APPARATUS
Filed April 20, 1955  23 Sheets-Sheet 7
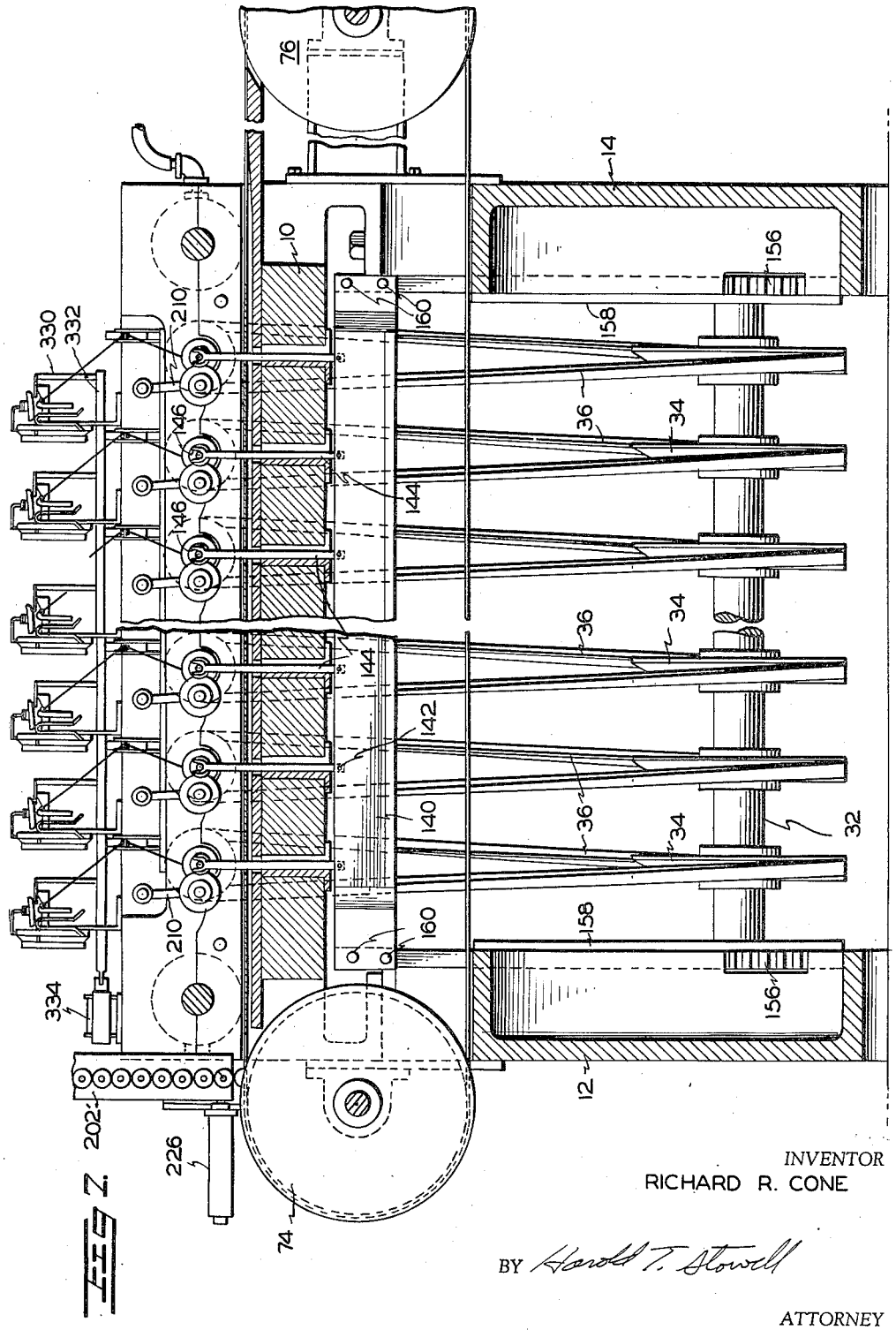
INVENTOR
RICHARD R. CONE
BY Harold T. Stowell
ATTORNEY

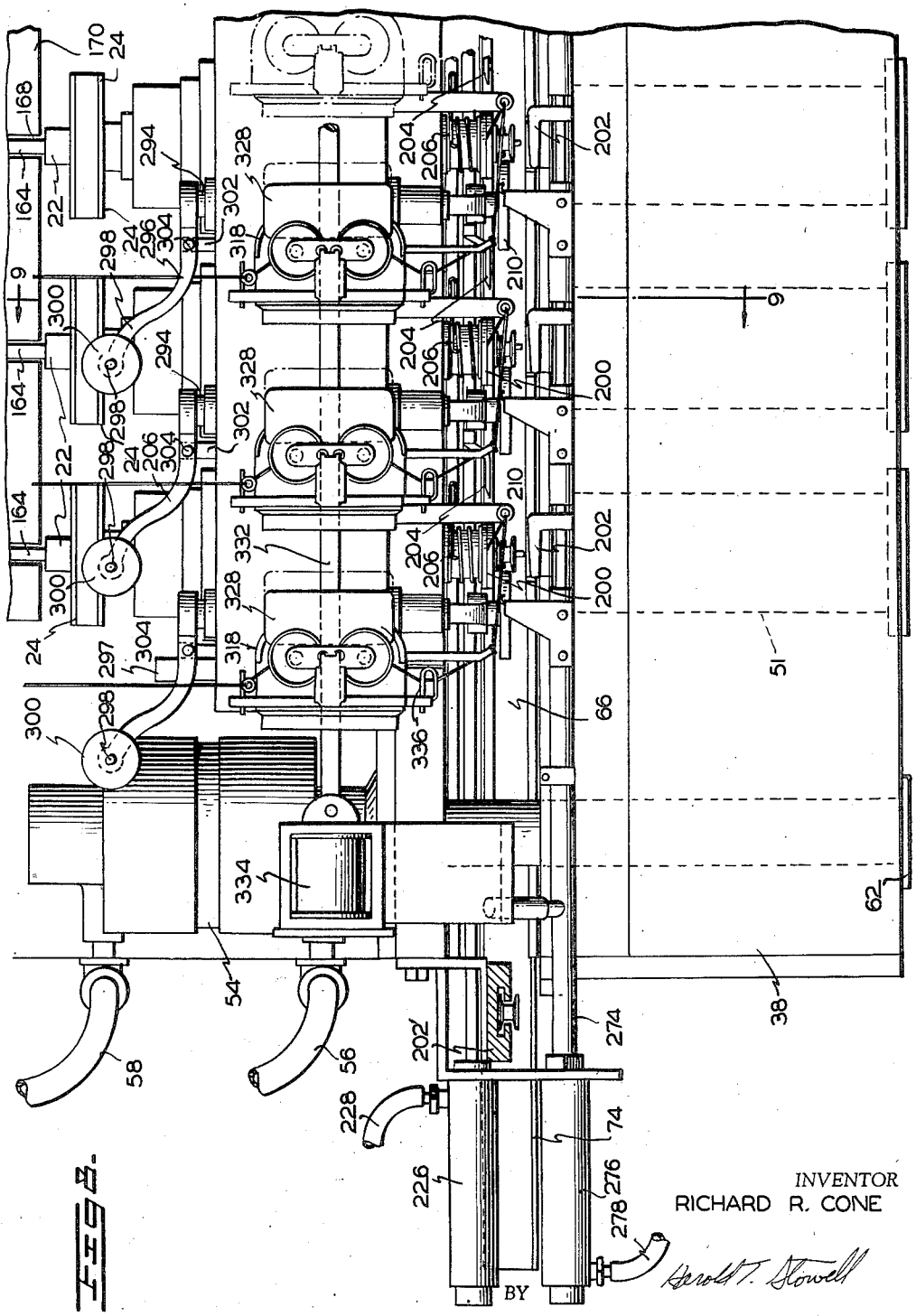

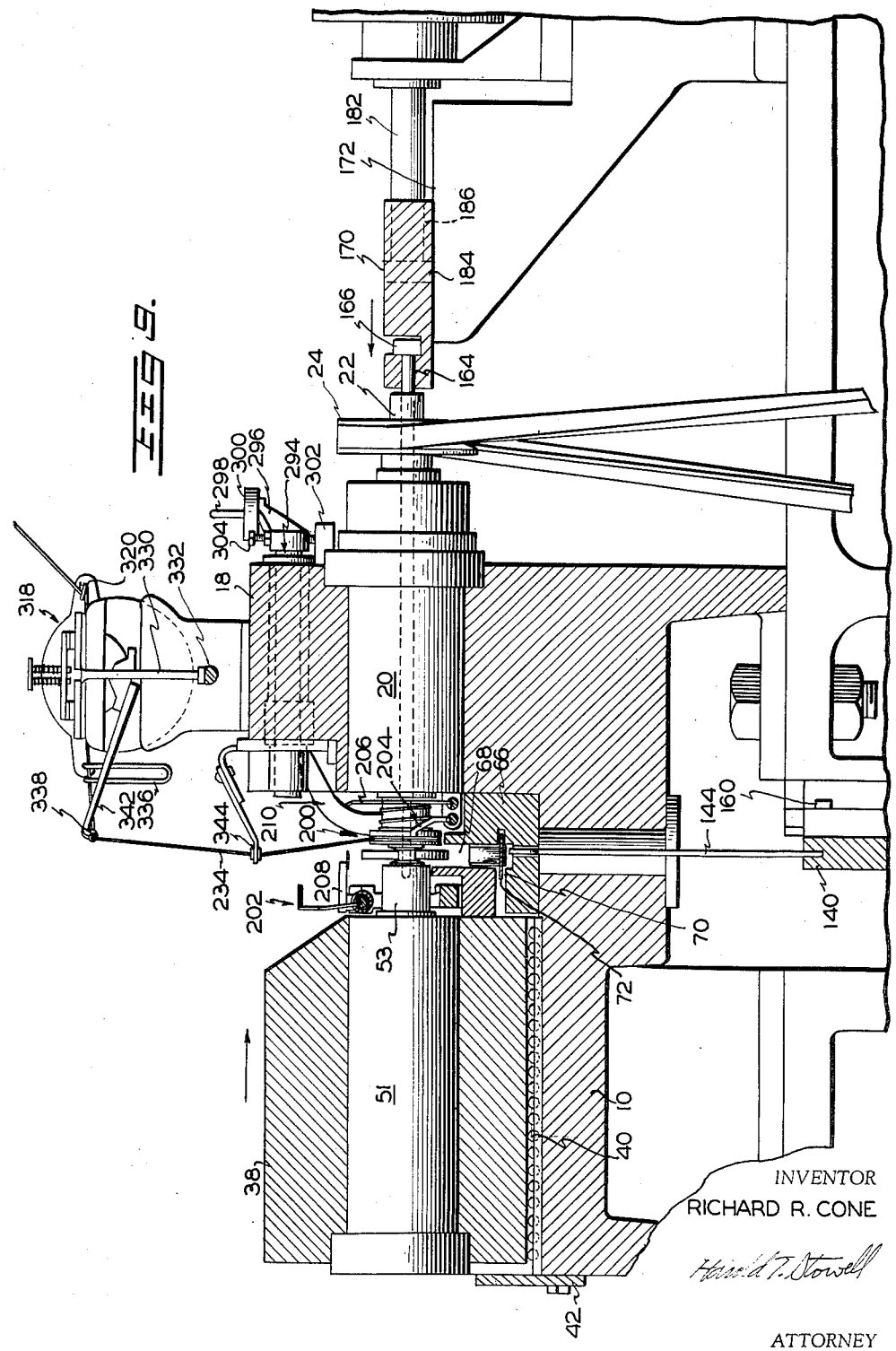

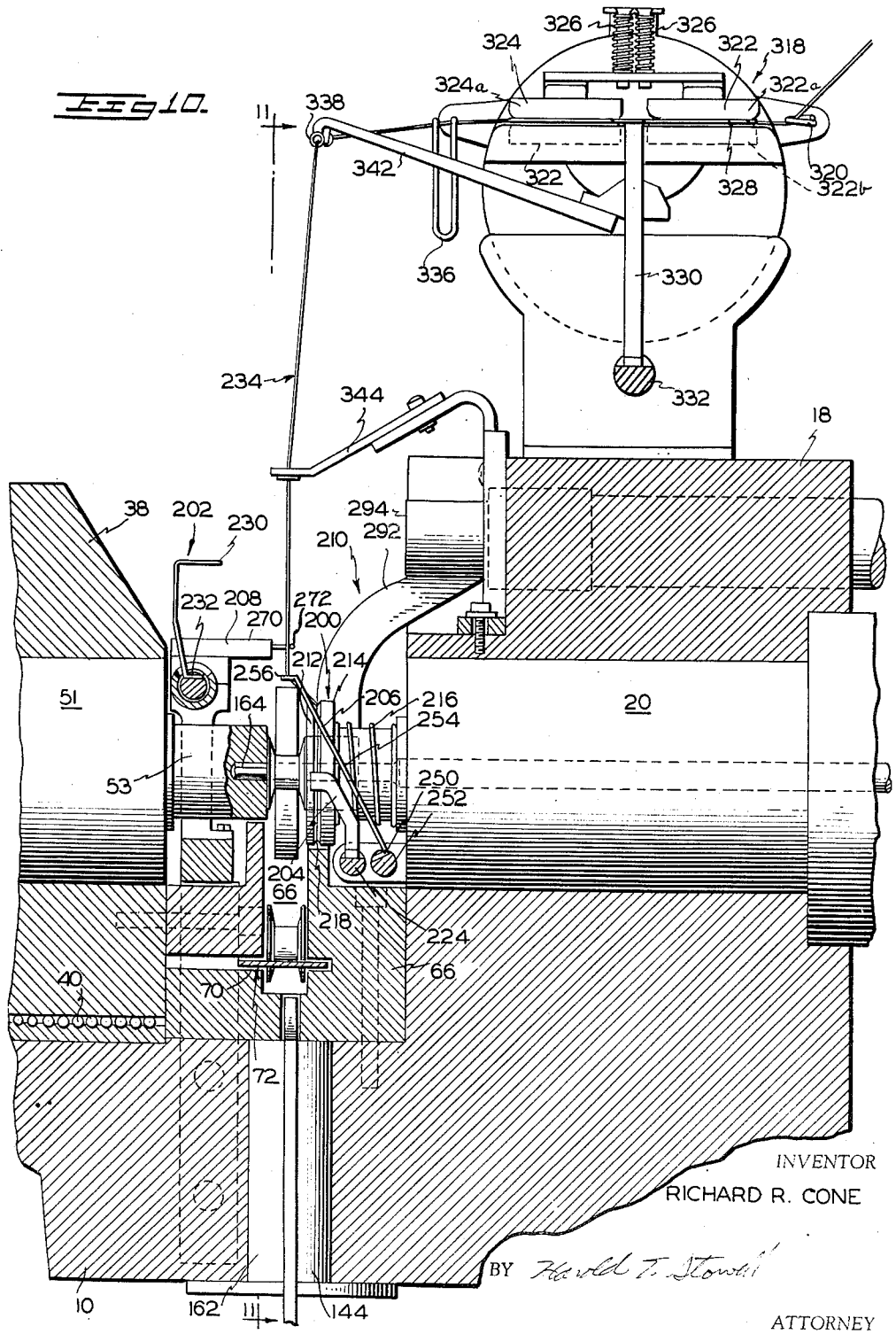

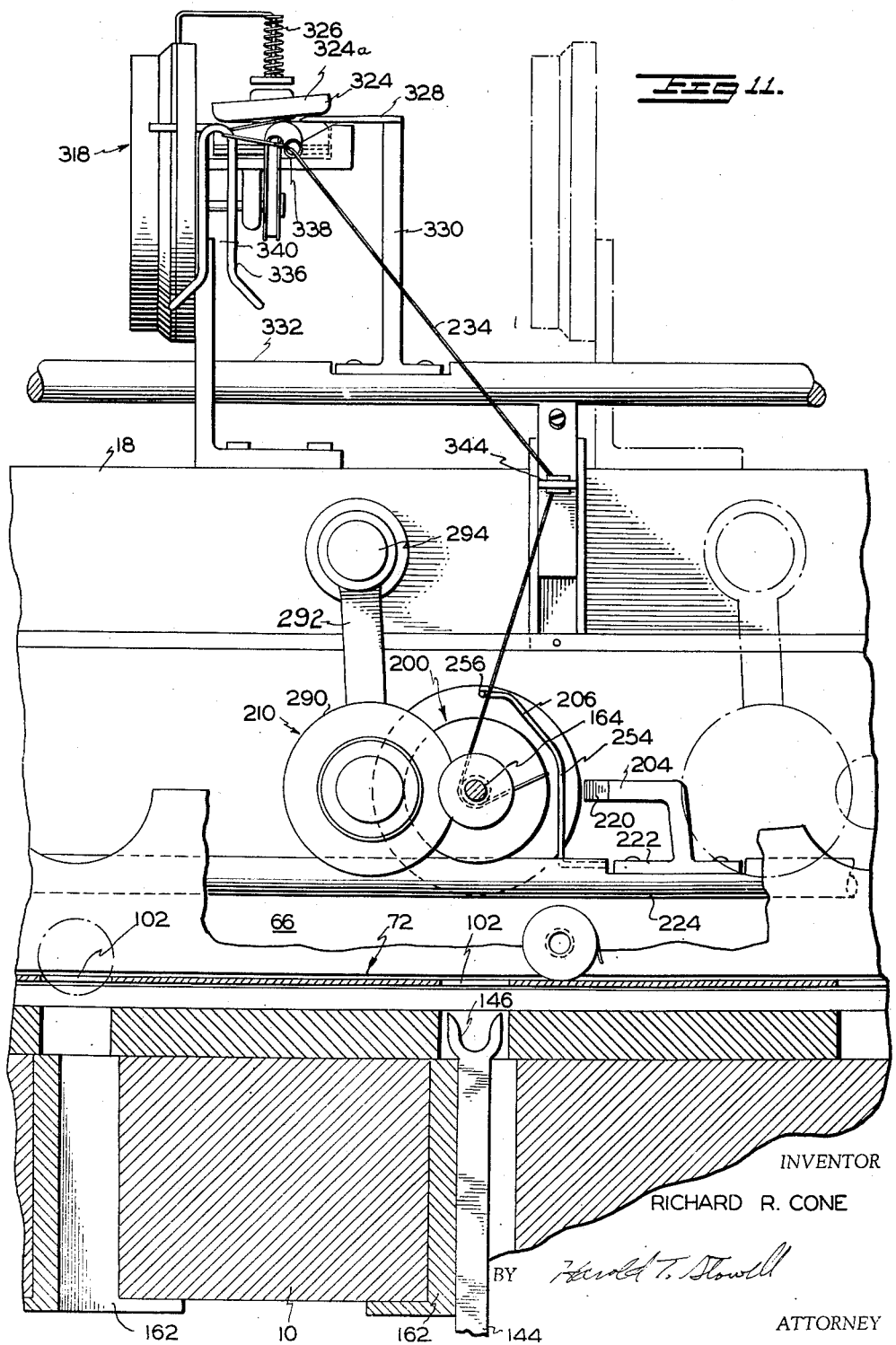

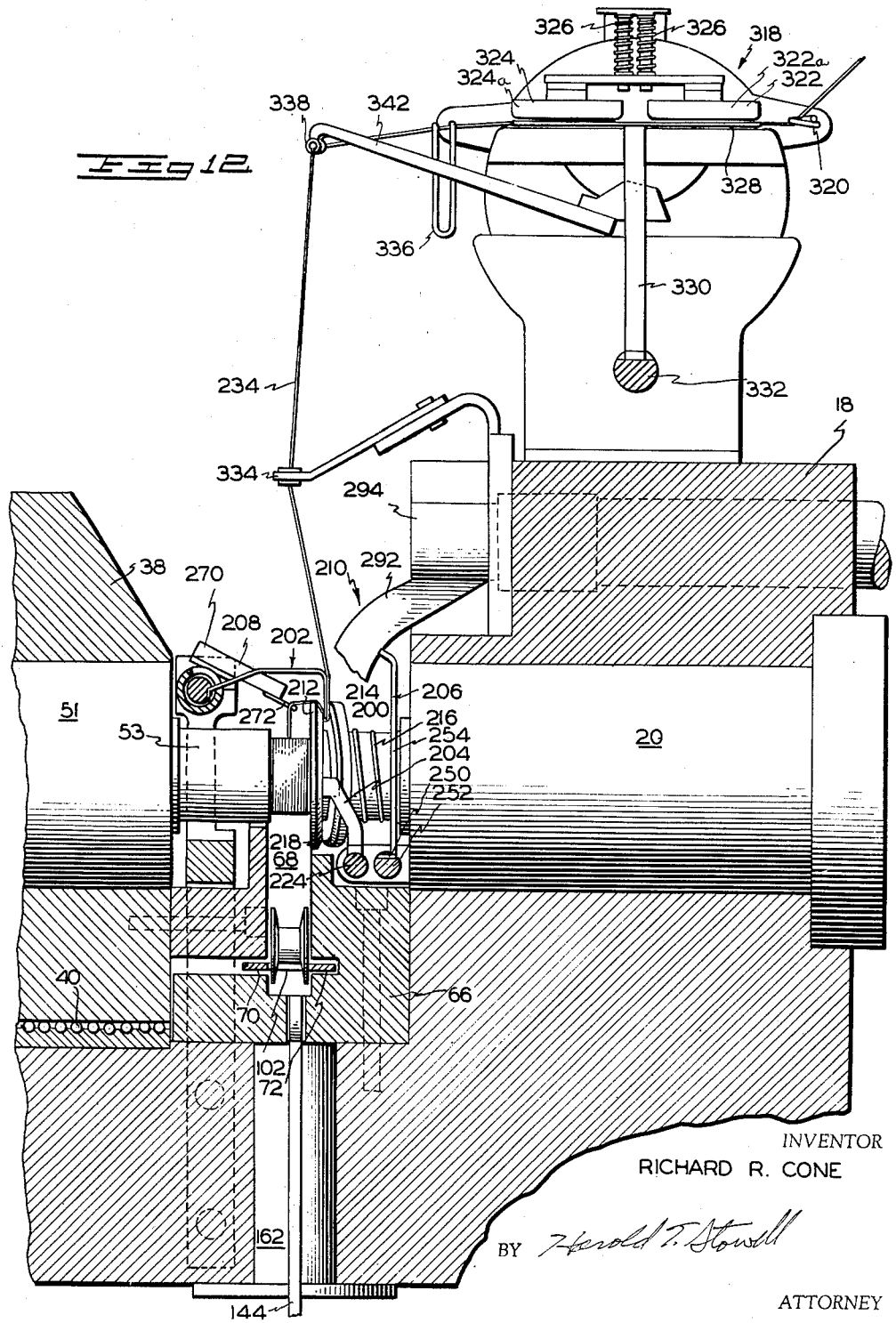

Dec. 3, 1957   R. R. CONE   2,815,178
THREAD PACKAGE WINDING APPARATUS
Filed April 20, 1955   23 Sheets-Sheet 13
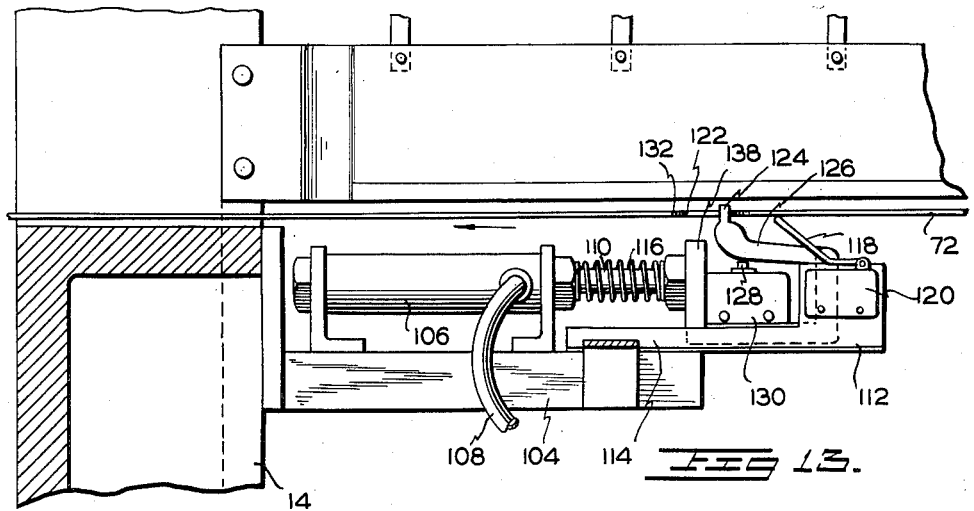
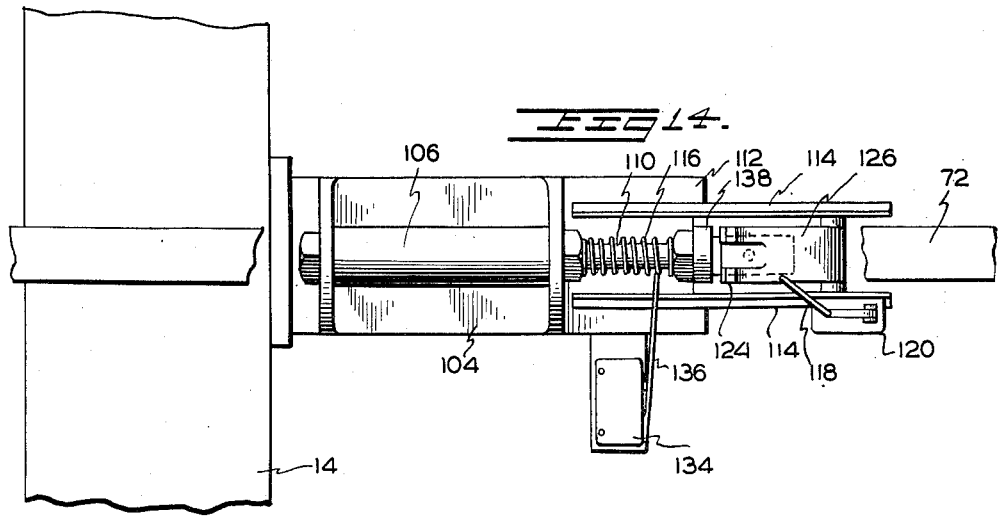
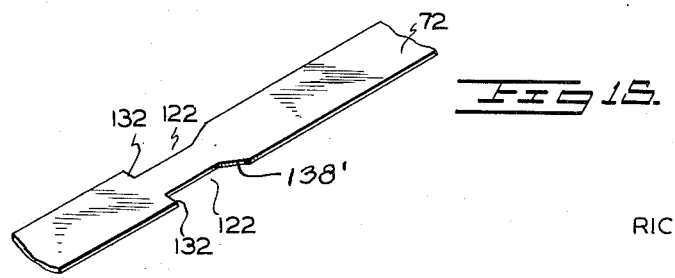
INVENTOR
RICHARD R. CONE
BY
ATTORNEY Dec. 3, 1957 R. R. CONE 2,815,178
THREAD PACKAGE WINDING APPARATUS
Filed April 20, 1955 23 Sheets-Sheet 14
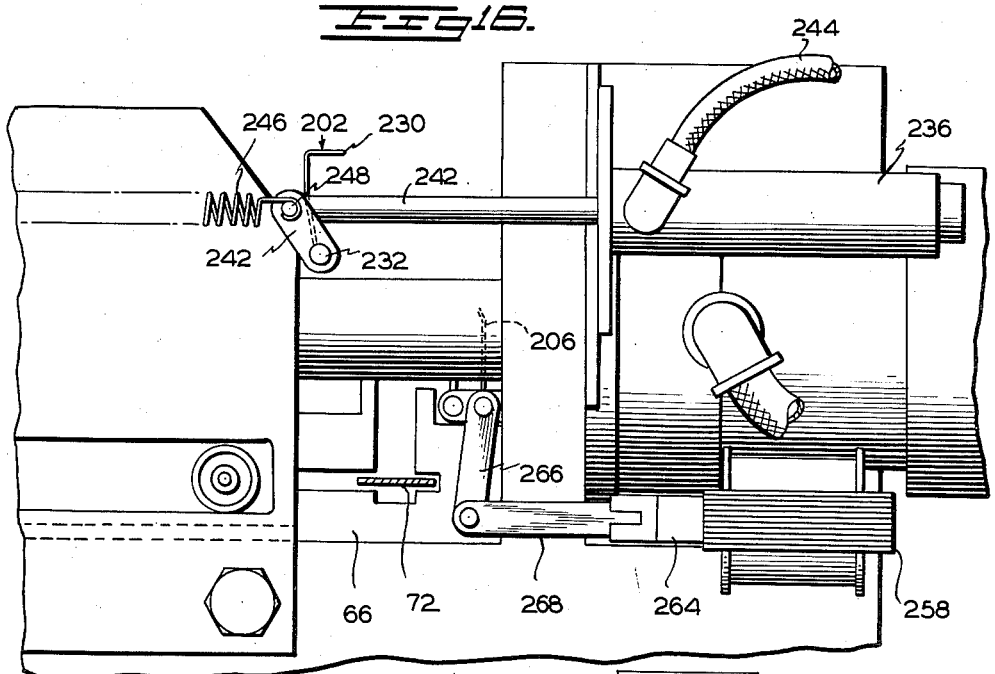
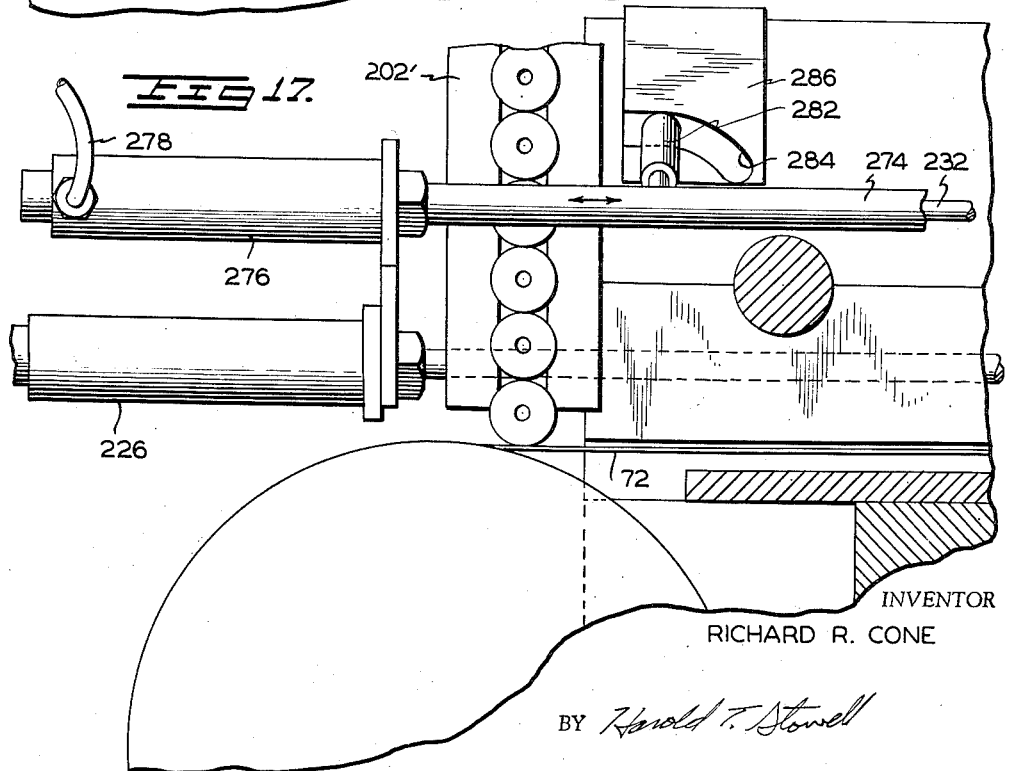
INVENTOR
RICHARD R. CONE
BY Harold F. Stowell
ATTORNEY Dec. 3, 1957 R. R. CONE 2,815,178
THREAD PACKAGE WINDING APPARATUS
Filed April 20, 1955 23 Sheets-Sheet 15
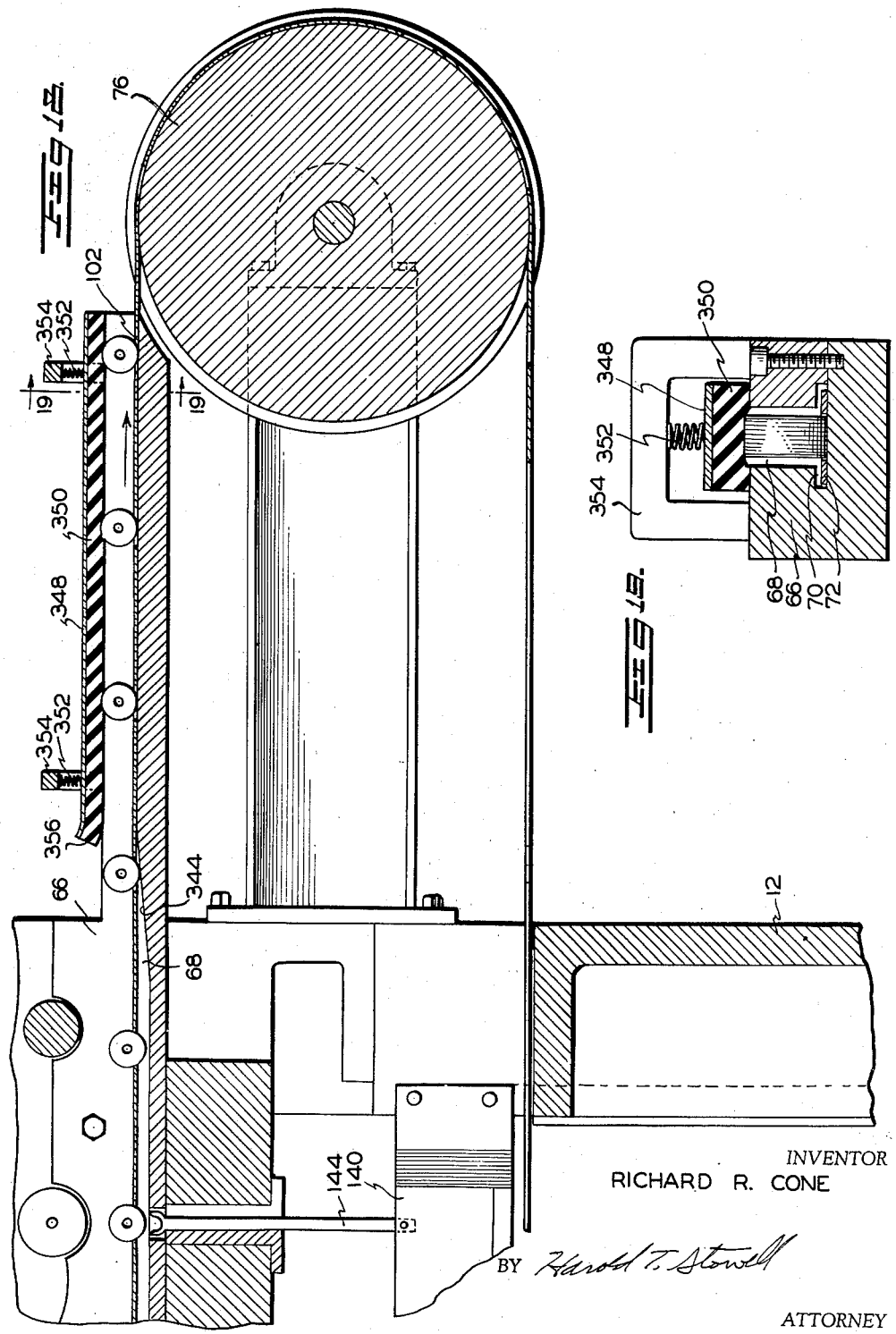
INVENTOR
RICHARD R. CONE
BY
ATTORNEY

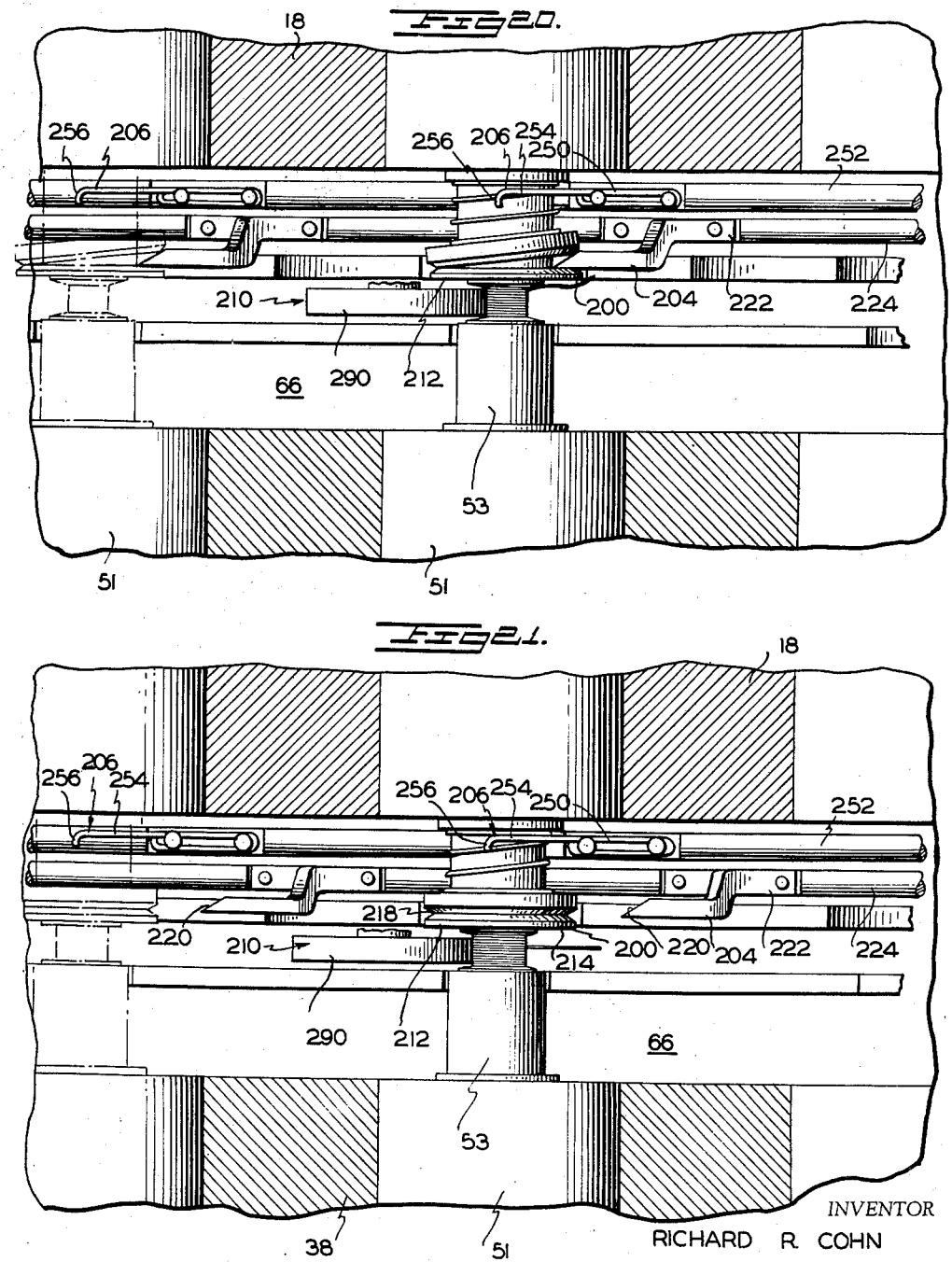

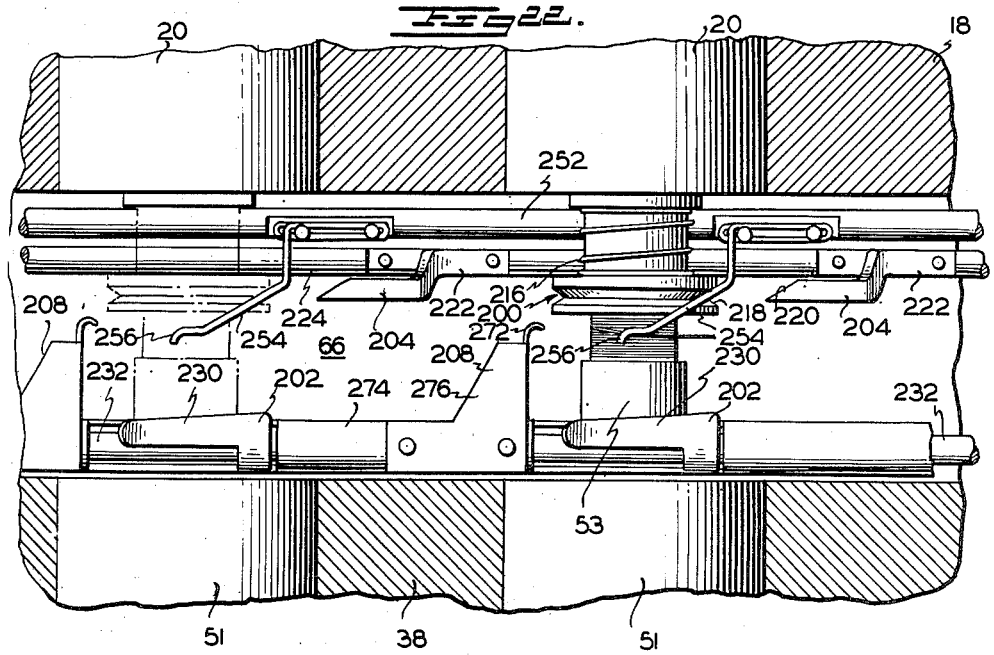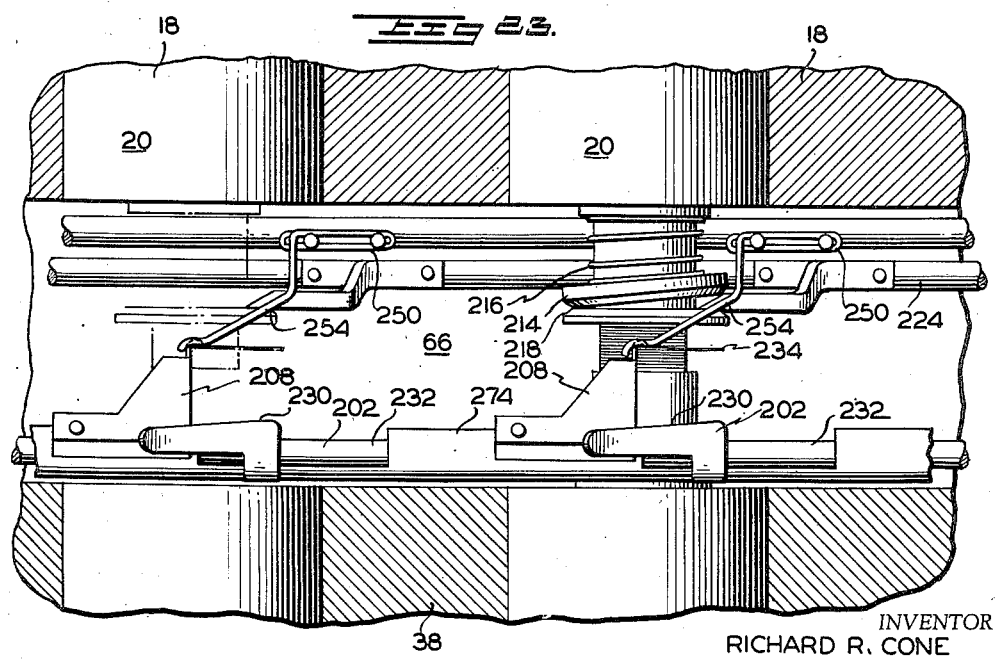

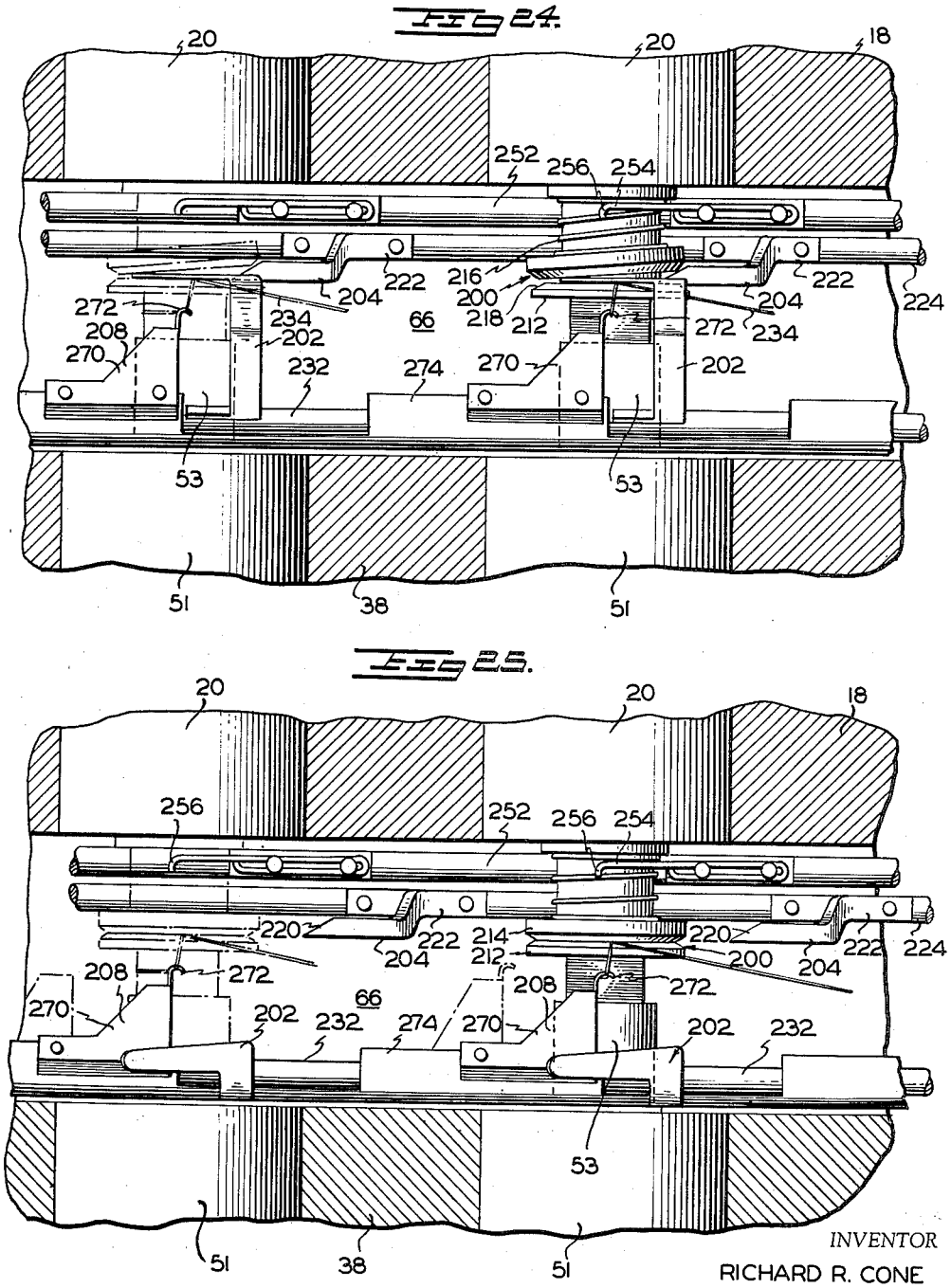

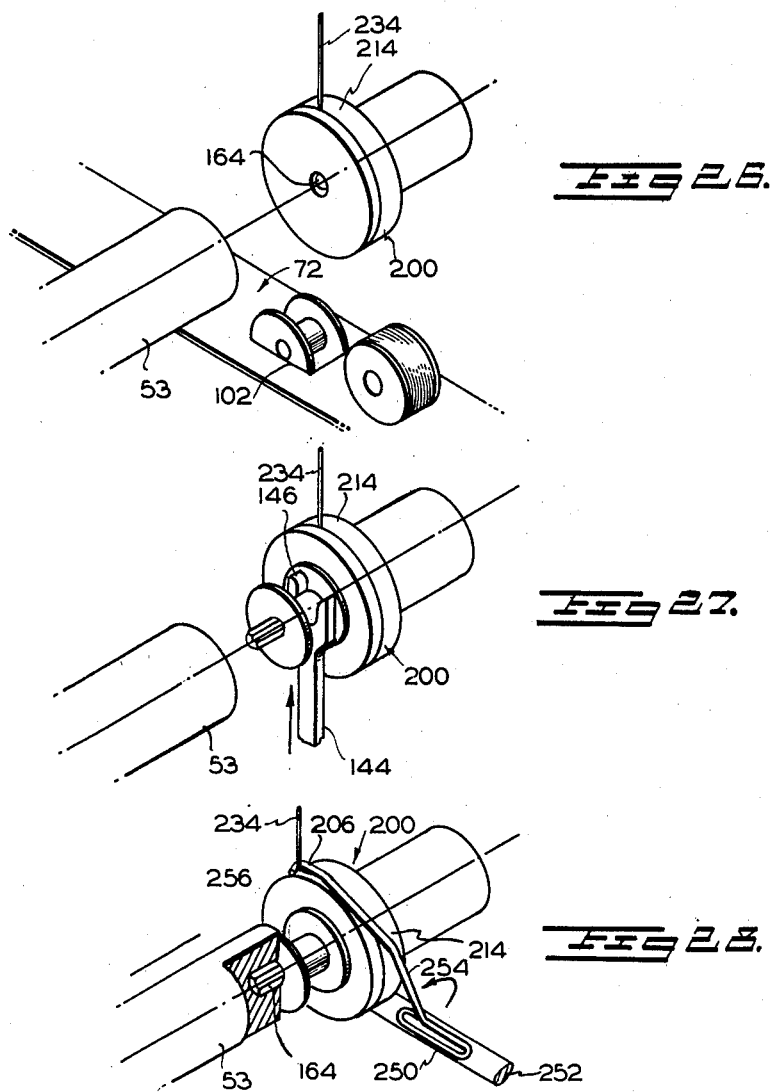

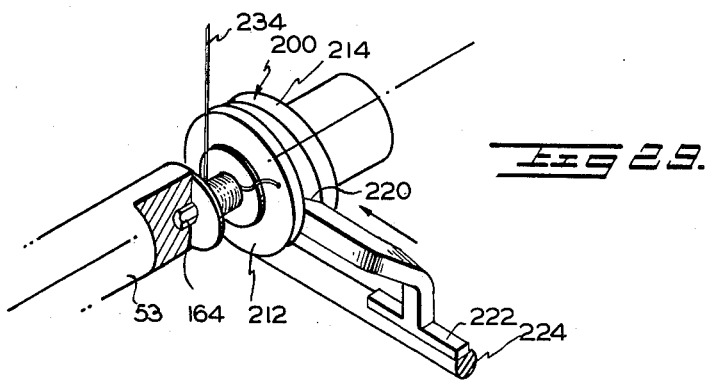
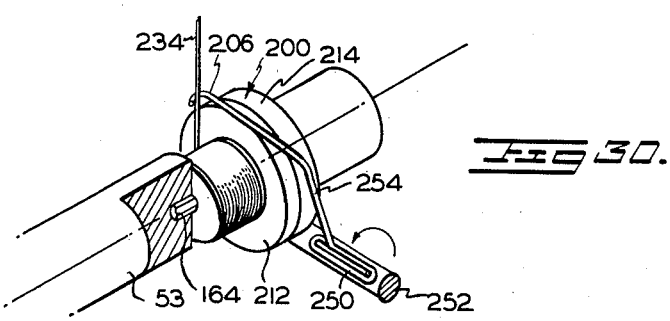
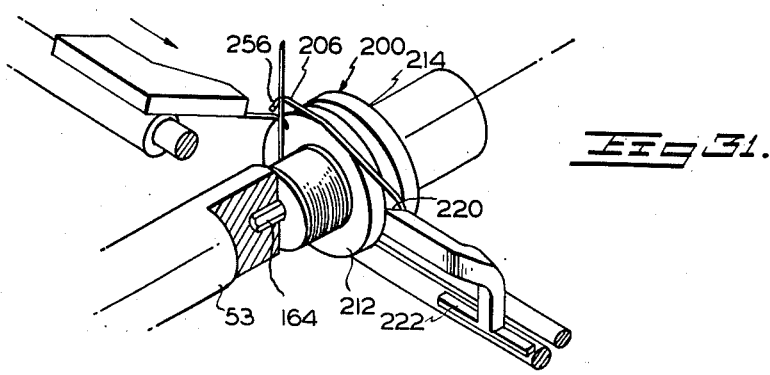

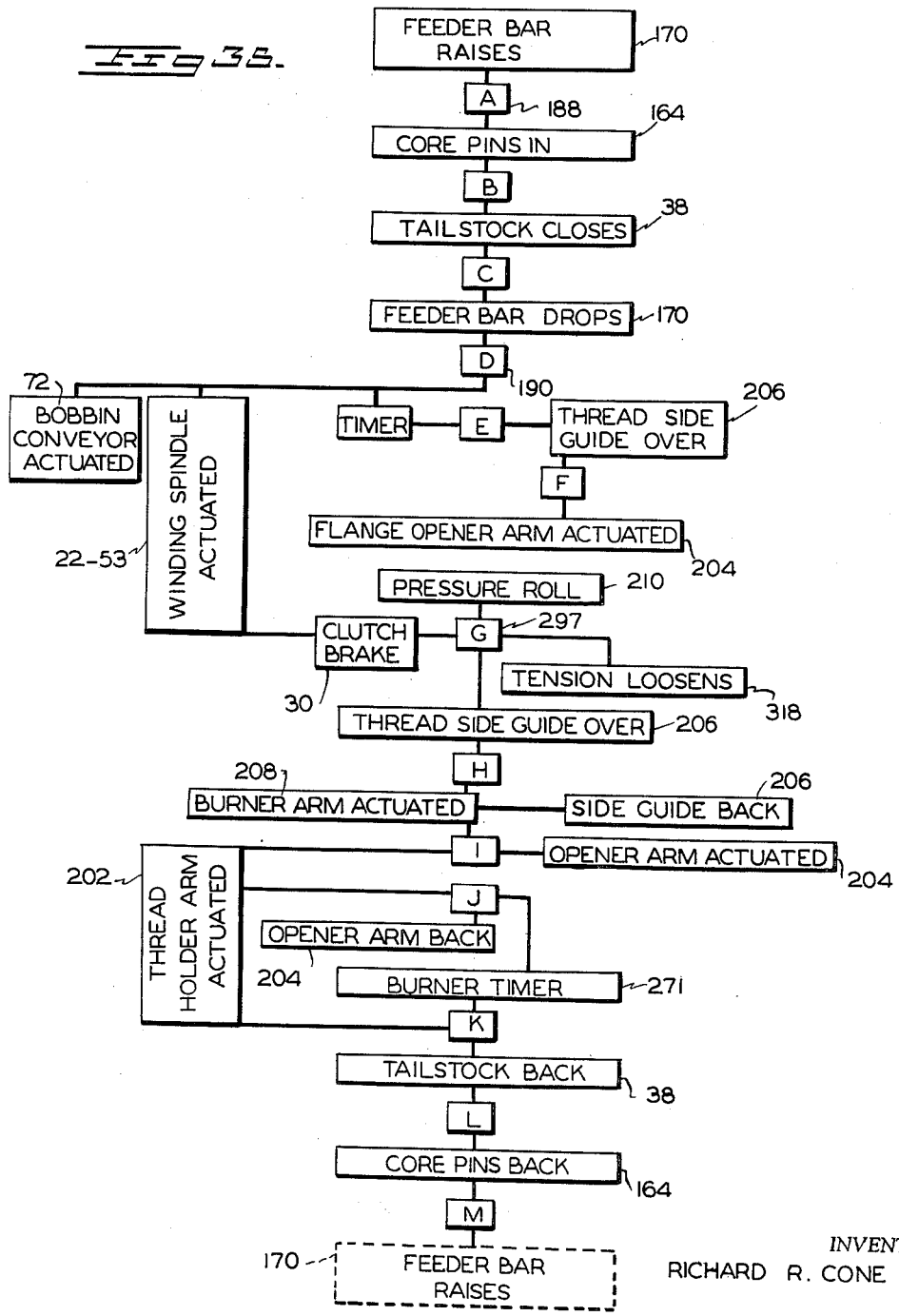

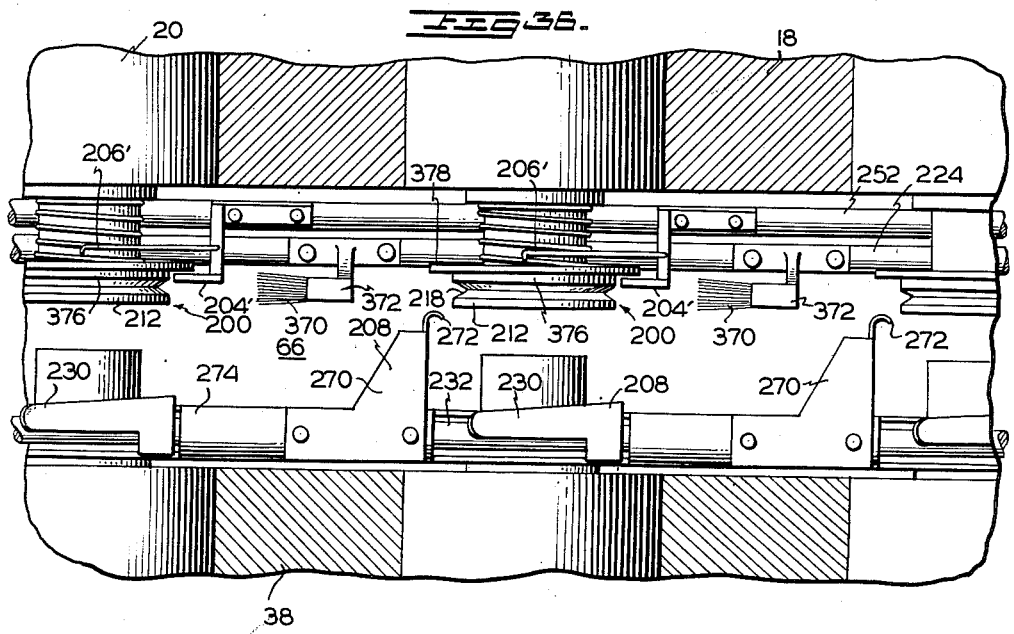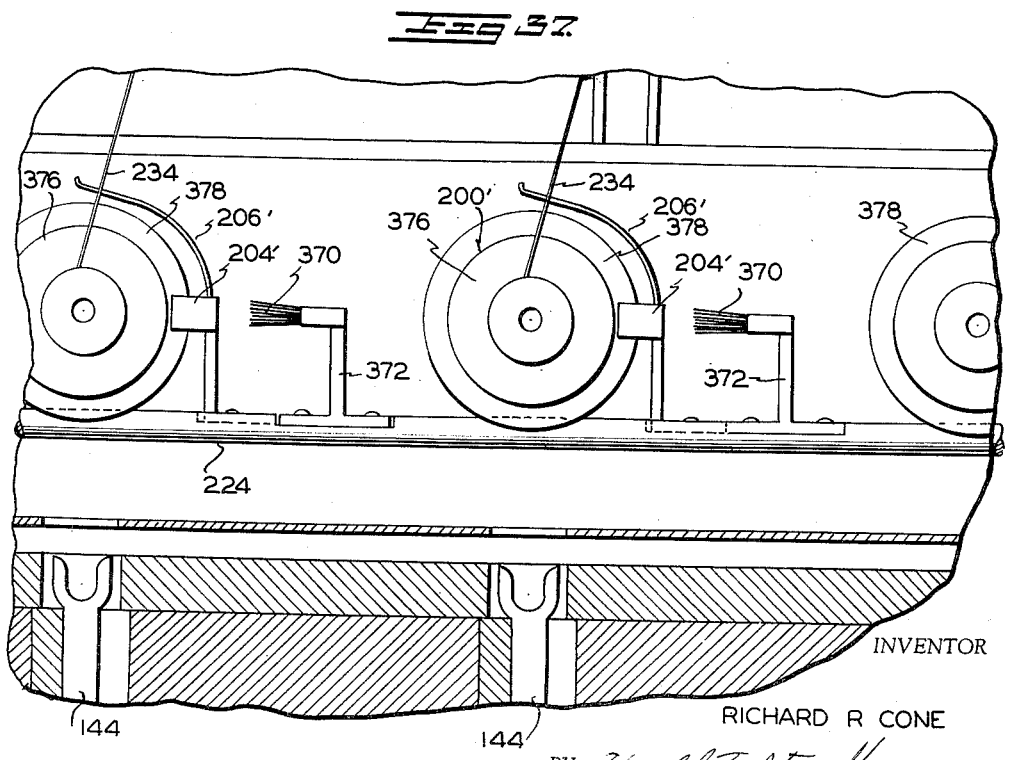

United States Patent Office 2,815,178
Patented Dec. 3, 1957

2,815,178

THREAD PACKAGE WINDING APPARATUS

Richard R. Cone, Gastonia, N. C., assignor to Threads-Incorporated, Gastonia, N. C., a corporation of North Carolina Application April 20, 1955, Serial No. 502,705

7 Claims. (Cl. 242—23)

This invention relates to new and improved apparatus for winding thread packages and in particular to an apparatus for winding thread on plastic sewing machine bobbins of the disposable type such as disclosed in my copending application Ser. No. 254,549, filed November 2, 1951, now Patent No. 2,712,804.

It is a primary object of the present invention to provide an apparatus for winding thread on bobbins that is fully automatic and cyclic in operation, whereby an empty thread package is automatically positioned between rotatable spindles of the winding apparatus, the thread is automatically positioned on the bobbin, the bobbin is wound with a predetermined quantity of thread, and under a predetermined density, the filled thread package is automatically doffed from the winding mechanism and a new bobbin to be wound is positioned in the winding mechanism as the filled bobbin is removed from the apparatus.

A further object is to provide such an apparatus wherein a plurality of bobbins may be filled simultaneously, with the same color and size of thread or any one or group of the bobbins may be wound with thread differing in color.

A further object is to provide such an apparatus wherein the particular shape and size of the thread package to be wound may be readily changed to meet the needs of the trade.

Another object of the invention is to provide a bobbin winding machine having a plurality of winding stations wherein all or any desired member of the stations may be operated simultaneously.

Further objects and advantages are to provide such a thread packaging machine wherein:

Each winding step is initiated in sequence to the preceding step of the bobbin filling process;

The filled thread packages leaving the machine are finished thread packages requiring only boxing for shipment or storage, which operation may be accomplished by automatic mechanisms not within the scope of the present invention; and The empty thread packages are positioned, doffed and readied for packaging in extremely short periods of time.

These and other objects and advantages are provided by the automatic thread package winding machine of the invention having a plurality of bobbin winding stations, each of the winding stations generally including a complementary headstock and tailstock rotatably supporting flanged spindles adapted to support the side flanges of a bobbin therebetween, drive means for the complementary headstock and tailstock, means cooperating with one of the flanged spindles for selectably holding and releasing the thread to be wound, thread compacting means urged into radial engagement with the thread mass being wound upon the bobbin, means cooperating with said thread compacting means for de-energizing said drive means when the bobbin is wound, means for doffing the wound bobbin, and conveyor means for moving the wound bobbins and transporting empty bobbins to each of the winding stations.

The invention will be more particularly described with reference to the illustrated embodiments thereof shown in the accompanying drawings in which:

Fig. 1 is a front elevational view of one form of the apparatus of the present invention having twelve bobbin winding stations;

Fig. 2 is a left side elevation of the machine shown in Fig. 1;

Fig. 3 is an enlarged fragmentary view in elevation of the right side of the machine shown in Fig. 1;

Fig. 4 is an enlarged section substantially on line 4—4 of Fig. 1;

Fig. 5 is a section substantially on line 5—5 of Fig. 4;

Fig. 6 is an enlarged fragmentary view of a portion of the section shown in Fig. 5;

Fig. 7 is a section substantially on line 7—7 of Fig. 6;

Fig. 8 is an enlarged fragmentary top plan of the machine shown in Fig. 1;

Fig. 9 is a section substantially on line 9—9 of Fig. 8;

Fig 10 is an enlarged fragmentary view of a portion of the section shown in Fig. 9;

Fig. 11 is a section substantially on line 11—11 of the portion of the machine shown in Fig. 10;

Fig. 12 is a view similar to that shown in Fig. 10 with a fully wound bobbin positioned at a winding station;

Fig. 13 is an enlarged fragmentary elevational view of the bobbin conveyor positioning mechanism;

Fig. 14 is a top plan view of the mechanism shown in Fig. 13;

Fig. 15 is an enlarged prospective view of a portion of the conveyor tracks;

Fig. 16 is an enlarged fragmentary view of the discharge end of the machine showing the actuating means for a portion of the thread handling mechanism;

Fig. 17 is an enlarged fragmentary view of the other end of the machine showing other actuating means for the thread handling mechanism;

Fig. 18 is an enlarged fragmentary sectional view of the discharge end of the conveyor for the bobbins showing the thread end compressing means;

Fig. 19 is an enlarged sectional view substantially on line 19—19 of Fig. 18;

Figs. 20 through 25 are enlarged detail views of one of the bobbin winding stations showing the various mechanical movements involved in winding and doffing a thread package;

Figs. 26 through 34 are diagrammatic views in perspective of a complete bobbin winding cycle beginning in Fig. 26 with an empty bobbin positioned on the bobbin conveyor mechanism through the step of severing the wound bobbin from the source of winding material;

Fig. 35 is a sequence diagram of the machine of the invention;

Fig. 36 is an enlarged fragmentary view in plan of a modified form of the present invention showing one complete bobbin winding station; and Fig. 37 is an enlarged vertical sectional view of the portion of the machine shown in Fig. 36.

Figure 32:
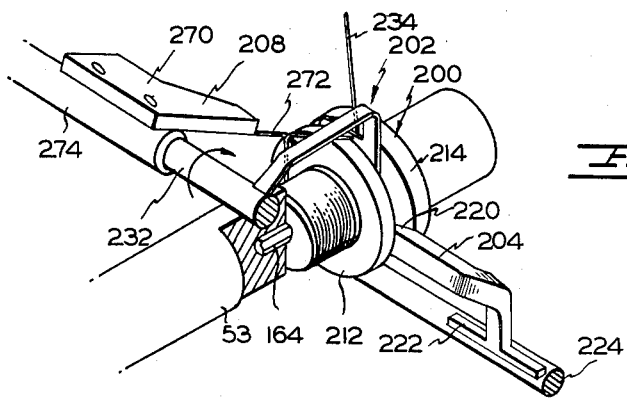

With reference to the drawings, 10 designates the main casting or bed of the bobbin winding machine. The bed is supported at either end by legs 12 and 14 having rails 16 secured at their lower ends.

The bed 10 includes a boss 18 which forms the fixed headstock of the bobbin winding machine and is provided with a plurality of horizontal bores, twelve of which are shown in the illustrated embodiments of the invention. The axis of the bores extend at right angles to the longitudinal extent of the boss 18 and secured within each of the horizontal bores is a drive spindle assembly 20 which includes a drive shaft 22 and suitable bearings therefor. Each of the shafts 22 has a pulley 24 keyed to the rearward extension thereof. A motor 26 is connected by V-belts 28 to the input shaft of a clutch and brake unit, of standard construction, generally designated 30. The output from the clutch and brake unit 30 is connected to a shaft 32 which extends between the legs 12 and 14 of the machine below the bed 10. Secured to the shaft 32 are a plurality of pulleys 34, as more clearly shown in Fig. 1 of the drawings, which pulleys are connected to their respective pulleys 24 by individual V-belts 36 whereby the drive shafts 22 of each spindle are driven in unison by the single motor 26 to insure that the bobbins being wound at each of the twelve winding stations are started, driven or stopped at the same time and at the same rate of speed.

While the drive means for the spindle shafts has been illustrated and described above as including pulleys and V-belts, it is apparent that other forms of drive means for effecting synchronous operation of the plurality of winding stations may be employed within the scope of the present invention. For example, all of the twelve spindle shafts 22 may be interconnected by gear means, or the V-pulleys and V-belts 24, 34, and 36 may be replaced with flexible type "timing belts" and sprockets of well known construction.

The forward portion of the bed 10 carries a movable tailstock 38. The tailstock is mounted for limited movement toward and away from the headstock 18 on ways carrying bearings 40 (Fig. 9) which movements are restricted by plate 42 bolted to the leading edge of the bed 10 and by stop members 44 resting on the bed 10 between the headstock 18 and the tailstock 38 as more clearly shown in Fig. 4. To insure accurate parallel alignment between the headstock and the movable tailstock side guide means 46 are secured to the bed 10 by bolts 48. The side guides 46 project upwardly from the bed 10 and are provided with machined slots 50 within which rollers 52, carried by the side edges of the movable tailstock 38, are adapted to rotate.

The tailstock, like the headstock, is provided with twelve horizontal bores, the centers of which are aligned with the corresponding bores in the headstock. Within each of the bores in the tailstock is secured an idle spindle assembly 51 including a shaft 53 rotatably supported in suitable bearings provided in the spindle assembly 51.

The position of the rearward stop of the movable tailstock 38, the length of the shafts 53 of spindle assemblies 51 extending beyond the inner edge of the tailstock, and the dimensions of the stop members 44, are so selected that when the tailstock is in its most rearward position, that is, closest to the spindles 20 of fixed headstock 18, the spaces between the driven shafts 22 of spindle assemblies 20 and the idle shafts 53 of spindle assemblies 51 will snugly accommodate the particular bobbins to be wound, with the side flanges of the bobbin supported for controlled axial displacement by the faces of shafts 22 and 53.

As more clearly shown in Figs. 3 and 4, tailstock 38 is actuated toward and away from the headstock 18 by double acting fluid pressure cylinders 54 secured at either end of the headstock 18. Fluid pressure for actuating the cylinders 54 is conducted from a source of pressure fluid through solenoid valves, not shown in the drawings, by conduits 56 and 58. The piston rods, for fluid pressure cylinders 54, extend through bores in the headstock 18 and in the tailstock 38 and are secured to the outer face of the tailstock by bolted flanges 62. Thus, it will be seen that as pressure fluid is directed from the source of fluid pressure to the cylinders 54 through conduits 56 the tailstock 38 is moved in a direction away from the headstock 18 while when fluid pressure is directed to the cylinder through the other conduits 58 the tailstock 38 is moved into operative relation with the headstock as to be more clearly described hereinafter.

The bed of the machine also includes machined ways 66, which extend the length of the machine between the headstock 18 and the tailstock 38 below the axis of spindles 22 and 53. The ways 66 are provided with a longitudinally extending slot 68 positioned directly beneath the space between the ends of the headstock and tailstock spindles, when the tailstock is in its most inwardly and operating position. The function of this slot 68, as to be more fully explained hereinafter, is for the introduction of unwound bobbins and the removal of wound bobbins from each of the twelve bobbin winding stations.

Adjacent the lower end of slot 68 is a second slot 70 which also runs the length of the machine parallel with slot 68. Slot 70 is adapted to receive an endless conveyor belt generally designated 72. The conveyor belt 72 extends between drive pulley 74, positioned at one end of the bobbin winding machine, and idler pulley 76, positioned at the other end of the machine. In the preferred form of the invention the conveyor drive pulley 74 is driven by motor 26 which, as hereinbefore described also drives the spindle shafts 22 for each of the bobbin winding stations, through pulley 78, the belt 80 and pulley 82 connected to the input shaft of gear reduction unit 84. The output shaft 86 of gear reduction unit 84 is connected to shaft 88 by sprocket 90, chain 92 and sprocket 94. In order to actuate the conveyor belt 72 without interfering with the operational cycle of the spindles 22, a clutch mechanism 96 interconnects the sprocket 94 with shaft 88. The clutch 96 is actuated through linkage 98 connected to electrical solenoid 100 which, in turn, is energized from a source of electrical power in timed sequence with the other operations of the bobbin winding machine.

The conveyor belt 72 is preferably constructed of flexible material such as sheet steel and is provided with a plurality of slots 102 extending therethrough at spaced distances. The slots 102 as more clearly shown, for example, in Fig. 10 are adapted to receive the empty bobbins to be wound and carry them as the conveyor belt 72 moves in the slot 68 of ways 66 to a position beneath each of the plurality of winding stations. It is apparent, therefore, that the conveyor belt 72 is provided with one or more sets of bobbin receiving openings 102 for each winding station depending upon the length of the endless conveyor belt, and that the distance between adjacent bobbin receiving slots is equal to the distance between the centers of adjacent spindles at each winding station.

The unwound bobbins are stored in a hopper 200' positioned above the drive pulley end of the conveyor 72. The hopper 200' is provided with a bobbin chute 202' which directs the bobbins to the upper surface of the conveyor belt as more clearly shown in Figs. 1, 2 and 7 so that as each bobbin slot 102 in the conveyor passes beneath the lower end of chute 202' a single bobbin is withdrawn and carried along by the conveyor belt. Any suitable vibratory feeding mechanism 204', as well known in the art, may be employed to direct the bobbins from the hopper 200' into the upper end of the bobbin chute 202'.

In order to insure that the empty bobbins are positioned directly beneath each bobbin winding station, the conveyor belt 72 is provided with an automatic conveyor stop and bobbin positioning means to be described in reference to Figs. 13 through 15 of the illustrated embodiments of the invention.

The conveyor stop mechanism generally comprises a platform 104 secured to leg 14 of the machine beneath the lower run of the conveyor belt 72. The platform 104 has secured thereto a fluid pressure actuated cylinder 106, provided with air inlet means 108 and piston rod 110. The piston rod is secured to an intermediate platform 112 which is slidable in ways 114 directly beneath the conveyor belt 72 as the piston rod 110 moves into the cylinder 106 upon actuation of the piston cylinder assembly. The return movement of piston rod 110 and its connected platform 112 is brought about by coil spring 116.

Reciprocable with the platform 112 is a feeler member 118 of switch 120 which is electrically connected to the conveyor belt clutch actuating solenoid 100 hereinbefore described. The feeler 118 is urged by spring means within the switch 120 into contact with one of the peripheral edges of the conveyor belt 72.

In addition to the plurality of bobbin receiving slots 102 longitudinally positioned within the conveyor belt 72, the belt is further provided with peripheral notches 122 more clearly shown in Fig. 15; there being one pair of notches 122 for each group of twelve bobbin retaining slots 102. As the conveyor belt is driven by pulley 74 and about idler pulley 76, the spring urged feeler member 118 senses the peripheral notches 122 thereby actuating switch 120 which switch in turn releases the conveyor clutch 96 through solenoid 100 and solenoid actuating arm 98.

Due to the inertia of the conveyor belt and its drive mechanism, the belt continues to move in the direction of the arrows even after the clutch 96 is released through feeler 118 and switch 120. However, upon further movement of the conveyor lugs 124, of bifurcated pawl 126, are urged into the recesses 122 by spring button 128 of switch 130. The upward movement of the switch button 128 energizes a solenoid actuated air valve, not shown in the drawings, which sends compressed air through conduit 108 to the cylinder 106 causing the piston rod 110 and movable platform 112 to move toward said cylinder. The inward movement of the platform 112 carries the bifurcated pawl 126 in the same direction whereby the upstanding lugs 124 engage the shoulders 132 of recesses 122 thereby moving the conveyor belt 72 to the limit of the stroke of the piston rod 110. A third switch 134 having switch actuating arm 136 is engaged by the end 138 of moving platform 112 at the end of this stroke. Actuation of the switch 134 by switch arm 136 indicates proper positioning of holes 102 and closes a circuit so that the bobbin lifters may rise therethrough. The conveyor positioning means returns to its normal position when the pawl 126 is forced downward by the next forward movement of the conveyor belt and portion 138' of notch 122 engages cammed surfaces of the lugs on the pawl.

From the foregoing description it will be seen that the peripheral recesses 122 in the conveyor belt 72 automatically cut off the conveyor drive mechanism through feeler 118 and switch 120 and the conveyor is positioned so that each bobbin within longitudinal recesses 102 is exactly positioned below its corresponding winding station by the lateral movement of lugs 124 secured to the platform 112. It will further be seen that through the expedient of the return spring 116 and the tapered edges 138' of conveyor belt recesses 122, the movable platform 112 is returned to its initial position upon energization of switch 134.

The means for elevating the unfilled bobbins from their position within the slots 102 of conveyor belt 72 to a position between the centers of spindles 20 and 51 will be described with particular reference to Figs. 5, 6 and 7 of the illustrated embodiments of the invention. Referring to the drawings 140 is a feeder bar which extends between the legs 12 and 14 below the ways 66 of the bobbin winding machine. The feeder bar 140 has secured thereto, such as by bolts 142, twelve rods 144, that is, one rod for each bobbin winding station. The upper ends of rods 144 are bifurcated as at 146 to receive therebetween the core of the bobbin to be elevated with the side flanges of the bobbin being supported by the opposed faces of said bifurcated ends. The upward movement of the feeder bar 140 and its connected lifting rods 144 is effected by fluid pressure actuated cylinders 148 having downwardly stroking piston rods 150 which are pivotally connected to arms 152. The other end of arms 152 are secured to partial gears 154, the teeth of which mate with sliding racks 156. One unit comprising a piston, partial gear and rack is carried adjacent each leg of the bobbin winding machine with each rack operating in a slot in its complementary leg and held in position by a bearing cap 158, shown in Fig. 7 of the drawings. The upper end of racks 156 are bolted as at 160 to the ends of lifting or feeder bar 140.

During the raising and lowering of the feeder bar 140 the lifting rods 144 are guided and directed into alignment with the center of the spindles 20 and 51 by bushings 162 secured in bores in the main bed 10 of the machine.

In order to provide axial support for the bobbins during the winding operation thereof, each of the spindles of the machine is provided with a retractable core pin 164. The form of and the actuating means for the core pins 164 will now be more particularly described with reference to Figs. 4, 5 and 9 of the drawings.

Each drive spindle 22 and driven spindle 53 is provided with an axial bore within which a core pin 164 is slidably mounted. The rearward ends of the core pins are provided with a head 166 adapted to engage one of the cross slots 168 in core pin puller bar 170. The puller bar 170 slides on ways 172 secured to each of the legs 112 and 114 rearwardly of the headstock 18. Stop pins 174 secured to the puller bar 170 adjustably stop the forward movement of the puller bar when forced against the headstock. The guide pins 174 are also provided with spring tensioning means 176 to cause puller bar to slightly retract after being positioned so as to provide clearance for the core pin head 166 in slot 168, thus preventing contact during winding.

The puller bar 170 is reciprocated by a pair of double acting fluid pressure cylinders 178 provided with solenoid actuated valves having pressure fluid connections 180, for directing fluid pressure to opposite sides of the piston. Each of the piston rods 182 of cylinders 178 is provided with an enlarged head 184 which engages a cross slot 186 at the rearward end of the feeder bar 170.

Thus it will be seen that if pressure fluid is directed to and from the conduits 180 piston rods 182 are reciprocated, which reciprocation actuates the feeder bar 170 and in turn the twelve core pins 164.

During the travel of the bobbins from the conveyor to a position between the center of the winding spindles as hereinbefore described, the core pins are in their retracted position. At the upward limits of the movement of the rack 156, switch 188' is actuated to energize the solenoid valves of cylinders 178 to cause flow of pressure fluid to the cylinders 178 causing the core pins 164 to move in a direction towards the tailstock 138 whereby the ends of the core pins penetrate through the bores in each of the bobbins to be wound.

When the core pins are in their innermost position, the tailstock cylinder solenoids are actuated and the tailstock 38 is moved towards the headstock 18 by fluid pressure pistons 54 as hereinbefore described so that the bobbins are held between the flanges of the drive spindle 22 and the driven spindle 53 as shown for example in Fig. 9 of the drawings. After the tailstock has pressed forward, the feeder bar 140 for the bobbins and its attached bobbin lifting rods 144 drops to its initial downward position. At the end of the downward stroke, switch 190 is actuated to begin the bobbin winding cycle as to be more fully described following the hereinafter detailed description of the thread handling mechanism. In general, the thread handling mechanisms of the bobbin winding machine are positioned between the headstock 18 and the tailstock 38 of the machine and include the following mechanism for each of the twelve winding stations:

(a) A thread holding means 200 best shown in Figs. 9, 10 and 11;

(b) A thread holding arm 202 which will be described in reference to Figs. 10, 11, 12 and 16;

(c) Thread holding means opener arm 204 which will be described with reference to Figs. 11, 12, 17, 24 and 25;

(d) A thread side guide 206 which will be described with reference to Figs. 10, 11, 16, 22 and 25;

(e) Thread severing means 208 which will be described with reference to Figs. 8, 9, 10, 12 and 24; and (f) Thread compacting means 210 which will be described with reference to Figs. 8, 9 and 11.

Referring to Figs. 8 through 11, each thread holding means 200 generally comprises a flange 212 secured to each drive spindle shaft 22. A portion of the outer face of the flange 212 provides lateral support for one face of the bobbin to be wound at each of the winding stations and determines the extent of the lateral deflection of the side flanges of the bobbin being wound. This portion of the flange 212 may be either concave, convex or flat, depending on the particular form of the bobbin to be wound as more fully described in my co-pending application Ser. No. 254,549, filed November 2, 1951. Each of the drive spindles 22 also carries a second flange designated 214 which is axially slidable on the spindle shaft and urged by coil spring 216 into engagement with the inner face of flange 212. The opposed edges of flanges 212 and 214 are preferably bevelled as more clearly shown in Fig. 10 at 218.

The thread holding means 200 at each winding station is provided with an opener arm 204, positioned, as more clearly shown in Fig. 11, with its wedge-shaped end 220 adjacent to and in alignment with the bevels 218 in the edges of the fixed and axially sliding flanges 212 and 214. The other end of the opener arm 222 is secured, such as by bolts, to rod 224 which extends the length of the machine below the plurality of drive spindles 22. The rod 224 is mounted for axial reciprocation from a position such as shown in Fig. 22 to a position as shown in Fig. 23 whereby the wedge-shaped end 220 of the opener arm may be forced between the fixed and axially slidable flanges of the thread holding means to urge the movable flange against the tension of spring 216 to provide a space between the two flanges. The opener arm shaft 224 is reciprocated by means of fluid pressure actuated piston 226, Fig. 8, provided with pressure fluid conduit means 228 connecting the piston with a source of pressure fluid and a solenoid actuated valve. The piston 226 is provided with a single pressure fluid conduit as the return stroke is brought about by internal spring means as is well known in the art.

Referring to Figs. 10, 12 and 16, each thread holder arm 202 comprises a metal blade having an edge 230 which extends parallel to the bevelled edges 218 of the fixed and movable flanges 212 and 214. The other end of the holder arm 202 is secured to the surface of rod 232 which like rod 224 extends the length of the machine between the headstock 18 and the tailstock 38 above the driven spindle 53. However, rod 232, unlike rod 224 is mounted for limited rotation about its axis whereby the thread holder arm 202 may be pivoted from a position as shown in Fig. 10 to a position as shown in Fig. 12 whereby the thread being wound, generally designated 234 may be tucked between the flanges 212—214 when the opener arm 204 is wedged between said flanges.

Referring to Fig. 16, the actuating means for rotating shaft 232 generally comprises a fluid pressure actuated cylinder-piston arrangement 236, secured to the headstock 18 of the machine and provided with a piston rod 240 which is connected to link means 242. The other end of link means 242 is secured to one end of rod 232. A fluid pressure conduit generally designated 244 directs fluid pressure from the source of pressure fluid through a solenoid actuated valve to the forward end of the piston cylinder arrangement 236 whereby the rod 240, the link 242 and in turn the rod 232 are actuated to drive the thread holder arm 202 into the position as shown in Fig. 12 of the drawings. The return stroke of the piston rod, the link means, and the holder arm is brought about by coil spring 246, one end of which is carried by the pivot pin 248 while the other end is secured to the tailstock 38.

The thread side guide 206 controls the position of the thread 234 at each of the bobbin winding stations during the initial portion of the winding step and again during the severing of the thread from the wound bobbin and will be described with reference to Figs. 10, 11, 16, 22 and 25. The thread side guide 206 includes a base portion 250 secured to rod 252 extending the length of the bobbin winding machine parallel to the opener arm shaft 224, and an angularly extending upstanding portion 254 provided with a looped end 256 to aid in engaging the thread 234. The thread side guide shaft 252, like the thread holder arm shaft 232, is mounted for limited rotation whereby the side guide may be pivoted from a position of engagement with the thread as shown in Fig. 10 to a position where the side guide is out of engagement with the thread as shown in Fig. 9. The mechanism for actuating shaft 252 is more clearly shown in Fig. 16 of the drawings and includes an electric solenoid 258. A movable armature 264 of the solenoid 258 is connected to one end of the shaft 252 through lever arm 266 and connecting link 268, whereby reciprocation of the armature 264 rotates shaft 252 and each of the twelve side guide arms 206.

The thread severing means 208 as more clearly shown in Figs. 8, 9, 10, 12 and 24 is of the electrical resistance type and includes an insulating support member 270 provided with a fine resistance wire tip 272 secured to one end thereof and connected to a suitable source of electric current through an electric timing device of standard construction. The other end of the insulating support 270 is secured to the surface of tubular shaft 274 which forms a sleeve about shaft 232 carrying the thread holder arm 202 hereinabove described. The movement of the thread severing means is from a position such as shown in Fig. 10 to a downwardly sloped longitudinally extended position prior to severing the thread 234 on the fully wound bobbin as shown in Fig. 12. This rocking motion of the thread severing means is brought about by the reciprocation and rotation of the cylindrical support 274. Referring to Fig. 17 of the drawings, the cylindrical support 274 is connected to the piston of fluid pressure actuated piston-cylinder unit 276 having pressure fluid inlet conduit 278 connecting the piston-cylinder unit with the source of pressure fluid through a solenoid actuated valve. As pressure fluid is directed to the pressure fluid piston-cylinder unit 276, support tube 274 is reciprocated in the direction of the arrow. In order to impart the rotative movement to the reciprocating sleeve a cam follower 282 is secured to the sleeve which follower engages cam track 284 in bracket 286 secured to the headstock of the machine. The return stroke of the burner unit is brought about by a spring within the piston-cylinder unit 276 as is well known in the art.

The last of the thread handling mechanisms, positioned between the headstock and the tailstock, is the thread compacting means 210. The thread compacting means, in the preferred form of the invention, comprises a roller 290, the peripheral surface of which is urged into engagement with the thread being wound on the bobbin at each of the bobbin winding stations. The roller 290 is rotatably supported at the lower end of arm 292 secured to shaft 294 journalled in the headstock 18. The other end of shaft 294, remote from the arm 292, is provided with a lever arm 296 having an upstanding member 298 secured to the end thereof remote from shaft 294. The tension or compressional force applied to the thread, as it is wound upon the bobbin, by the roller 290 is controlled by placing suitable weights designated 300 on the stake member 298. In order to limit the movement of each of the rollers 290 in a direction toward its complementary winding station a stop member 302 is secured to the headstock 18 and an adjusting pin 304 is threadably mounted in the lever arm 296, whereby the roller will not be permitted to swing between the center of rotation of the driven and drive spindle when a full bobbin is doffed at each of the winding stations. The lever arm 296 also actuates switch 297, Fig. 8, to initiate the bobbin doffing cycle when the bobbin is fully wound as to be described in the operating procedure of the machine.

In addition to the aforementioned thread handling mechanisms positioned between the head and tailstocks of the bobbin winding machine, two additional thread handling means are provided on the machine of the present invention.

The first of these additional thread handling means is for handling the thread 234 between each of the thread spools 210 and its respective bobbin winding station and will be described with particular reference to Figs. 2, 10 and 11.

The second thread handling means is adapted to tuck the free end of the thread into the completely wound and doffed bobbin and will be described with reference to Figs. 18 and 19.

Referring to Figs. 2, 10 and 11, each of the bobbin winding stations is provided with its own spool or cop of thread, supported in a substantially vertical position upon a spool support element generally designated 312. The thread 234 feeds from the spool upwardly over a thread guide 314 and between the leaves of a spring urged tensioning element generally designated 316 supported from the bed of the bobbing winding machine, above the spool support 312.

The thread then passes to the primary thread tensioning and control means generally designated 318.

The thread tensioning and control means 318 includes a thread guide 320 and a pair of disc type tensioning means 322 and 324. The upper discs 322a, 324a, respectively, are urged into engagement with lower discs 322b and 324b by springs 326. In order to vary the tension applied to the thread 234 by the disc tensioning means 322 and 324, during various phases of the winding cycle, each tensioning means is provided with a disc spreader or opener blade 328 carried by a shaft 330 secured to actuating bar 332 supported along the upper surface of the headstock 18. The bar 332 is reciprocated from a position of engagement with the discs of the disc tensioning means 322 and 324, such as shown in Fig. 11, to a position wherein the blade 328 is out of engagement with said discs, by an electric solenoid 334 more clearly shown in Figs. 7 and 8 of the drawings.

The thread control means 318 also includes a fixed thread guide 336 and a movable thread guide 338. The fixed thread guide 336 is provided with a generally vertically extending elongated opening 340 through which the thread passes whereby the thread may be positioned at any point throughout the longitudinal extent thereof by movement of the movable thread guide 338. The movable thread guide 338 is carried at one end of a pivotally mounted arm 342 spring urged to normally maintain the thread 234 at the upper end of the slotted thread guide 336 as shown in Fig. 10 of the drawings. However, during periods in the bobbin winding cycle when slack is required in the thread 234, as to be more fully described in the operating procedure of the machine, the pivotally mounted arm 342 is pivoted downwardly in a direction toward its associated bobbin winding station providing the necessary slack in the thread between the tensioning means 318 and the winding station.

A further fixed thread guide 344 secured to the headstock 18 of the machine guides the thread 234 from the final thread tensioning means 318 to its associated bobbin winding station.

After the thread is wound upon the bobbins at each of the twelve winding stations and the filled bobbins are removed from between the head and tailstocks of the machine, it is desirable to tuck or smooth the loose end of the thread which has been severed from the source of thread 310 by the thread severing means 208 into the thread already wound on the bobbins. The smoothing of the loose end of the thread on each bobbin is accomplished by modification of the form of the longitudinal extending slot 68 in the ways 66 as shown more particularly in Figs. 18 and 19. The slot 68 in the ways 66, at the opposite end of the machine from the bobbin loading means 200, is provided with a gradually upwardly inclined base or floor portion 346 so that the bobbins being carried in the slots in the conveyor belt 72 are lifted therefrom as the flanges of the bobbins engage the lower end of the floor of the ways 66. Positioned above this portion of the ways is a horizontal plate 348, having secured to its lower face a strip of resilient material 350 such as sponge rubber or the like. The plate 348 and its attached resilient strip 350 are urged by springs 352, supported in U-brackets 354, toward the upper face of the ways 66 and into engagement with the thread on the fully wound bobbins as more clearly shown in Fig. 19 of the drawings. As the conveyor belt 72 continues to move the bobbins, in the direction of the directional arrows, the drag on the bobbin by the resilient material 350 being urged into engagement therewith causes the loose end of the thread wound upon the bobbins to be smoothed and pressed into the compacted thread thereon. In order to facilitate the passage of the bobbins through the thread smoothing portion of the machine the inner end of the plate 348 and its attached resilient material is provided with a slight upward bend as at 356. The filled bobbins or thread packages leaving the thread smoother are then ready for use or further processing such as packaging or the like.

Having described the structural elements of my bobbin winding machine, its operation will be detailed with reference to the enlarged fragmentary views of Figs. 20 through 25, the perspective views as shown in Figs. 26 through 34, and the sequence diagram of Fig. 35. For clarity, since the bobbin winding procedure is identical at each of the twelve bobbin winding stations, the operation of the machine will be described with reference to only a single winding station.

Beginning, for purposes of illustration, with the elements of the machine positioned as shown in Fig. 26 wherein the core pin 164 is in the retracted position, a filled bobbin is doffed from the winding station of a previous winding cycle, the tailstock is back away from the headstock, an empty bobbin is positioned on the conveyor belt 72 directly below the centers of the spindles 22 and 53 and the thread from the source of thread 310 is secured between the fixed and movable flanges 212 and 214 of the spindle 22, the feeder bar raises the lifting rod 144 carrying the unwound bobbin from its position on the endless belt 72 to a position between the centers of the spindles 22 and 53 as shown in Fig. 27. As soon as the bobbin is positioned between the drive and driven spindles, switch A, Fig. 35, is actuated energizing the core pin solenoid and the core pin 164 is moved forward to support the bobbin on center between the spindles. When the core pin reaches its extended position, the solenoid valves of piston-cylinder assemblies 54 are energized through switch B moving the tailstock spindle 53 into tight engagement with the bobbin whereby the bobbin is held between the faces of spindle 53 and drive spindle 22.

After the tailstock has pressed forward, switch C is actuated and the bobbin lifter rod 144 drops to its lowermost position below the endless conveyor belt 72 and closes the starting switch D which energizes the spindle clutches beginning the actual winding operation, and causes the side guide 206 to move the thread 234 toward the tailstock so that as the spindles 22 and 53 rotate the thread is wound upon the core of the bobbin and not upon the flanges 212 and 214 of the spindle 22.

While the thread is beginning to wind upon the fresh bobbin so that the end of the thread is anchored, the conveyor belt 72 moves the wound bobbins from beneath the bobbin winding station into the bobbin smoothing station, and carries a fresh unwound bobbin to its position beneath the winding station as shown in Fig. 26. After the thread is securely anchored on the bobbin, the timer (Fig. 35) closes switch E and the side guide 206 returns to its initial position actuating switch F and the thread cross-winds upon the bobbin by pressure exerted thereon by the roller 290 as shown in Fig. 20. At this stage of the thread package filling operation, the loose end of the thread still maintained between the side flanges 112 and 114 of spindle 22 is released by actuation of the opener arm 204 in such a manner as to contact the bevelled faces of the flanges forcing the spring urged flange 214 away from the fixed flange 212 so that space is provided therebetween. This phase of the winding process is shown in Figs. 20 and 29. After the clamping flanges 212 and 214 release the held end of the thread, it is soon wound under the next layer of thread being wound upon the bobbin and the opener arm 204 returns to its normal position. When the thread, wound upon the bobbin, reaches the proper diameter movement of the pivotally mounted pressure roll 290 actuates the knock-off switch G and the doffing cycle of the thread package winding method begins.

At the beginning of the doffing cycle, the clutch-break mechanism generally designated 30 stops the spindles 22 and 53, the tension on tensioning device 318 loosens, and the side guide 206 moves to a position shown in Figs. 30 and 22 whereby the end 256 thereof is in engagement with the thread 234. This movement of the side guide 206 actuates switch H.

The thread severing means 208 is energized by switch H and moves forwardly and downwardly, whereby the thread held by the side guide 206 is engaged by the burner tip 272 as shown in Figs. 23 and 31. Upon engagement of the thread by the burner tip 272, the thread side guide 206 returns to its normal position, and switch I is actuated permitting the opener arm 204 to move back into engagement with the edge of the movable flange 214 of spindle 22; the thread holder arm 202 then carries the thread over the burner tip 272 and down between the opposed faces of flanges 212 and 214 being held open by the opener arm 204.

Figure 33:
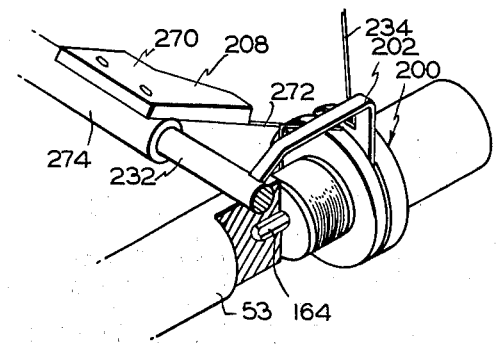
Figure 34:
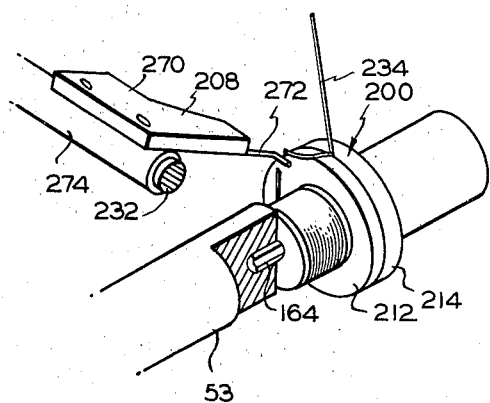

At the end of the thread holder arm stroke switch J is actuated so that the opener arm 204 is withdrawn, as shown in Figs. 25 and 33, allowing the spring loaded flange 214 to clamp on to the thread holder arm and the thread. The thread severing burner tip timer 271 is also energized by switch J whereby the thread, between the wound bobbin and the flanges of spindle 22 is severed. As soon as the thread is severed, the burner tip timer actuates switch K which energizes the solenoid for the tailstock cylinder and releases the thread holder arm solenoid valve. The tailstock then withdraws from its position of engagement with the bobbin, and actuates switch L so that the core pin 164 is withdrawn from the bobbin core allowing the filled bobbin to drop on to the conveyor. When the core pin is fully retracted switch M is actuated thereby so that the feeder bar raises to bring a fresh bobbin into winding position which begins a new cycle of operation of the bobbin winding machine.

From the foregoing description, it will be seen that the present invention provides an apparatus for winding thread on bobbins and the like that is fully automatic and cyclic in operation whereby empty thread packages are automatically positioned between rotatable spindles of the winding apparatus, thread is automatically positioned on the bobbins, the bobbins are wound with a predetermined quantity of thread under a predetermined density, the filled thread packages are automatically doffed from the winding mechanism, and new bobbins to be wound are positioned in the winding mechanism as the filled bobbins are removed from the bobbin winding machine.

It will be evident to those skilled in the art that various modifications may be made in the construction and form of the thread package winding machine and in the form of the mechanism for carrying out the various functions of the winding cycle. For example, in the illustrated form of the invention, pressure fluid actuated piston-cylinder units generally have been employed for actuation of the tailstock, and the various thread handling mechanisms. However, it will be apparent that other forms of actuating means such as electrical solenoids could readily be employed without modifying the efficient operation of the machine.

It will further be apparent to those skilled in the art that the particular thread tensioning and handling means as shown and described with reference to Figs. 1 through 34 of the drawings may be variously modified. For example, in Figs. 36 and 37, a modified form of the thread handling means positioned between the head and tailstock of the bobbin winding machine is shown. In the modified form of the invention, elements corresponding to those in Figs. 1 through 34 have been given identical reference numerals and modified elements have been provided with new or primed reference numerals.

Referring to Figs. 36 and 37, a brush element 370 is secured at right angles to standard 372 which, in turn, is attached to reciprocating rod 224 replaces the opener arm 204 carried by shaft 224 in the form of the invention shown in Figs. 1 through 34. Further, a modified form of flange opener arm 204' is carried by reciprocating and rotating shaft 252. The opener arm 204' is combined with a modified thread guide 206' also supported and actuated by shaft 252.

Spindle 22 carries fixed flange 212 and a movable flange 376 with the fixed and movable flanges 212 and 376 provided with bevelled faces as in the prior described form of the invention. However, in this form of the invention, the opener arm 204' does not urge the flange 376 against the tension of spring 216 away from the fixed flange 212 by a wedging action. Instead the opener arm 204' is adapted to engage the radially extending face 378 of the flange 376. The face 378 of flange 376, adapted to be engaged by the side of opener arm 204', is preferably hardened to prevent excessive wear of this part when the flange 376 is urged away from the flange 212 during the high speed rotation of the flanges.

In operation of this form of the invention with the thread clamped between the flanges 212 and 376 of the drive spindle 22, the thread guide 206' carried by shaft 252 is rotated toward the tailstock of the bobbin winding machine whereby the thread is brought into alignment with the bobbin being wound. As previously described as soon as a few turns of thread are made upon the bobbin to securely anchor the thread, the side guide moves away from its position above the bobbin to the neutral position as shown in Fig. 36 and then further toward the headstock of the machine so that opener arm 204 urges the flange 276 against the tension in spring 216 away from flange 212. As soon as the flange 376 is moved away from the fixed flange 212 brush 370 slides in a direction parallel to its supporting shaft 224 and presses inwardly towards the center of the spindle 222 to engage the thread within the space between the fixed and the slidable flanges to insure that the loose end of the thread is removed, so that it will not be reclamped when the opener arm 204' permits the flange 276 to return to its normal position. When the brush has completed its forward stroke it returns to its normal position as shown in Fig. 36 of the drawings.

The bobbin now continues to be wound with thread under pressure of the pressure roller 209 as described with reference to Fig. 1 through 34 of the drawings. Just before the thread on the bobbin reaches its diameter maximum, the double tension of tensioning device 318, is released so that about the last two layers of thread to be wound on the bobbin are wound at a relaxed thread tension. When the bobbin reaches its maximum diameter the knock-off switch stops the spindle through the clutch break mechanism 34 so that the doffing cycle can proceed. As soon as the spindles have come to a dead stop, the pivotally mounted thread severing arm moves toward the wound bobbin while the thread side guide 206' also moves toward the center of the bobbin so that the thread is pushed over to contact the burner heater element as previously described. When the burner arm completes its forward stroke, the side guide releases the thread and immediately goes to an extreme opposite stroke whereby the opener arm 204' opens up the space between the fixed flange 212 and the slidably mounted flange 376. The thread holder arm 202 now moves over across the thread and positions it between the opened flanges of spindle 22. With the thread tucked between the fixed and movable flanges, the burner tip is energized and the burning or severing of the thread takes place. At the same time, the burner tip is energized, the opener arm 204' is returned to its neutral position as shown in Fig. 36 leaving the severed end of the thread held between the flanges of the spindle 22 and the thread holder arm 202 returns to its neutral position.

With the severed end of the thread held between the fixed flange 212 and the movable flange 376 of spindle 22, the tailstock retracts, the core pin is withdrawn, the filled bobbin drops to the conveyor belt, and the lifter arm lifts a new bobbin into position between the spindles of the machine. The bobbin winding cycle hereinbefore described is now ready to begin again as soon as the core pin passes through the empty bobbin and the tailstock moves to its closed position.

Having thus described the structural and functional advantages and features of the present invention in its preferred and modified embodiments, and clearly and specifically disclosed a new and improved high speed thread package winding machine which satisfies all the objects and advantages heretofore set forth, what is desired to be claimed is:

1. An automatic thread package winding machine having a plurality of bobbin winding stations, each of the winding stations including a complementary headstock and tailstock, flanged spindles rotatably supported in said headstock and tailstock adapted to support the side flanges of a bobbin therebetween, drive means for the complementary headstock and tailstock, means cooperating with one of the flanged spindles for selectively holding and releasing the thread to be wound comprising a fixed flange and a flange slidably mounted on the spindle, spring means normally urging the slidably mounted flange into axial engagement with the fixed flange, means for moving said slidably mounted flange away from said fixed flange against the tension of said spring means, thread compacting means urged into radial engagement with the thread mass being wound upon the bobbin, means for deenergizing said drive means when the bobbin is wound, means for doffing the wound bobbin, and conveyor means for moving the wound bobbins and transporting the empty bobbins to each of the winding stations.

2. An automatic thread package winding machine having a plurality of bobbin winding stations, each of the winding stations including a complementary headstock and tailstock, flanged spindles rotatably supported in said headstock and tailstock adapted to support the side flanges of a bobbin therebetween, drive means for the complementary headstock and tailstock, means cooperating with one of the flanged spindles for selectively holding and releasing the thread to be wound comprising a fixed flange and a flange slidably mounted on the spindle, spring means normally urging the slidably mounted flange into axial engagement with the fixed flange, means for moving said slidably mounted flange away from said fixed flange against the tension of said spring means, a pivotally mounted arm for tucking the thread to be wound between the fixed and movable flanges when said movable flange is urged away from said fixed flange against the tension of said spring means, thread compacting means urged into radial engagement with the thread mass being wound upon the bobbin, means for deenergizing said drive means when the bobbin is wound, means for doffing the wound bobbin, and conveyor means for moving the wound bobbins and transporting the empty bobbins to each of the winding stations.

3. An automatic thread package winding machine having a plurality of bobbin winding stations, each of the winding stations including a complementary headstock and tailstock, flanged spindles rotatably supported in said headstock and tailstock adapted to support the side flanges of a bobbin therebetween, drive means for the complementary headstock and tailstock, means cooperating with one of the flanged spindles for selectively holding and releasing the thread to be wound comprising a fixed flange and a flange slidably mounted on the spindle, spring means normally urging the slidable flange into axial engagement with the fixed flange, means for moving said slidably mounted flange away from said fixed flange against the tension of said spring means, a pivotally mounted arm for tucking the thread to be wound between the fixed and movable flanges when said movable flange is urged away from said fixed flange against the tension of said spring means, thread compacting means urged into radial engagement with the thread mass being wound upon the bobbin, means for deenergizing said drive means when the bobbin is wound, means for doffing the wound bobbin including means for severing the thread being wound upon the bobbins when the thread is held between the fixed and movable flanges of said one of said spindles, and conveyor means for moving the wound bobbins and transporting the empty bobbins to each of the winding stations.

4. An automatic thread package winding machine having a plurality of bobbin winding stations, each of the winding stations including a complementary headstock and tailstock carrying spindles adapted to support side flanges of a bobbin therebetween, drive means for the complementary headstock and tailstock, means cooperating with one of the spindles for selectively holding and releasing the thread to be wound, thread compacting means urged into radial engagement with the thread mass being wound upon the bobbin, means for deenergizing said drive means when the bobbin is wound, means for doffing the wound bobbin, endless belt conveyor means positioned below the plurality of bobbin winding stations for moving wound bobbins therefrom and transporting empty bobbins from a source of bobbins to each of the winding stations, said endless belt conveyor being provided with a plurality of bobbin receiving slots, means for elevating the empty bobbins from a position within the slots on the conveyor belt to a position between the spindles mounted in the complementary headstock and tailstock, said bobbin elevating means comprising rods having bifurcated ends adapted to pass through the bobbin slots of the conveyor belt and engage the core of the bobbins.

5. The invention defined in claim 4 including means at the discharge end of said endless belt conveyor for smoothing the loose end of the thread into the thread mass wound upon the bobbins.

6. An automatic thread package winding machine having a plurality of bobbin winding stations, each of the winding stations including a headstock, a spindle rotatably mounted in said headstock, a tailstock reciprocably mounted adjacent said headstock, second spindle means rotatably mounted in said tailstock concentrically with said spindles in the headstock, core pins reciprocably mounted in the spindles in said headstock adapted to engage bores in the spindles in the tailstock when in the extended position and said tailstock is reciprocated toward said headstock, said spindles adapted to support the side flanges of a bobbin therebetween, drive means for the complementary headstock and tailstock, means cooperating with one of the complementary spindles for selectively holding and releasing the thread to be wound, thread compacting means urged into radial engagement with the thread mass being wound upon the bobbin, means for deenergizing said drive means when the bobbin is wound, means for doffing the wound bobbin, an endless belt conveyor means positioned between said headstock and the tailstock for moving wound bobbins and transporting empty bobbins to each of the bobbin winding stations.

7. An automatic thread package winding machine having a plurality of bobbin winding stations, each of said winding stations including a headstock, a spindle rotatably mounted in said headstock, a tailstock reciprocably mounted adjacent said headstock, second spindle means rotatably mounted in said tailstock concentrically with said spindles in the headstock, core pins reciprocably mounted in the spindles in said headstock adapted to engage bores in the spindles in the tailstock when in the extended position and said tailstock is reciprocated toward said headstock, said spindle adapted to support the side flanges of a bobbin therebetween, drive means for the complementary headstock and tailstock, means cooperating with one of the complementary spindles for selectively holding and releasing the thread to be wound, thread compacting means urged into radial engagement with the thread mass being wound upon the bobbin, means for deenergizing said drive means when the bobbin is wound, means for doffing the wound bobbin including means for severing said thread being wound upon said bobbin, an endless belt conveyor means positioned between said headstock and tailstock for moving wound bobbins and transporting empty bobbins to each of the bobbin winding stations including means associated with said conveyor for elevating empty bobbins to a position between the spindles of the headstock and the tailstock when said tailstock is reciprocated in a direction away from said headstock, and means for reciprocating said core pins, means for reciprocating said tailstock, means for actuating said conveyor, means for actuating said bobbin lifting means, means for rotating said spindles, means for selectively actuating said thread holding and releasing means, means for energizing said thread severing means all in timed relationship.

References Cited in the file of this patent

UNITED STATES PATENTS

| | | |
|---|---|---|
| 168,801 | Stevens | Oct. 11, 1875 |
| 1,805,544 | Haas | May 19, 1931 |
| 2,646,494 | Fegan | July 21, 1953 |
| 2,676,763 | O'Neill | Apr. 27, 1954 |
| 2,682,377 | Grady et al. | June 29, 1954 |

FOREIGN PATENTS

| | | |
|---|---|---|
| 161,606 | Germany | July 3, 1905 |
| 202,331 | Switzerland | Apr. 17, 1939 |
| 672,153 | Great Britain | May 14, 1952 |